United States Patent
Wouhaybi et al.

(10) Patent No.: US 9,917,892 B2
(45) Date of Patent: Mar. 13, 2018

(54) METHOD, DEVICE, AND SYSTEM FOR AD-HOC RESOURCE SELECTION

(75) Inventors: Rita H. Wouhaybi, Portland, OR (US); Aaron D. Davies, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 320 days.

(21) Appl. No.: 13/997,749

(22) PCT Filed: Mar. 31, 2012
(Under 37 CFR 1.47)

(86) PCT No.: PCT/US2012/031746
§ 371 (c)(1),
(2), (4) Date: Dec. 1, 2014

(87) PCT Pub. No.: WO2013/147902
PCT Pub. Date: Oct. 3, 2013

(65) Prior Publication Data
US 2015/0180965 A1     Jun. 25, 2015

(51) Int. Cl.
*G06F 15/16*     (2006.01)
*H04L 29/08*     (2006.01)
(Continued)

(52) U.S. Cl.
CPC .... *H04L 67/104* (2013.01); *G06Q 10/063112* (2013.01); *H04L 12/1822* (2013.01);
(Continued)

(58) Field of Classification Search
CPC ................... H04L 51/32; H04L 12/588; H04L 20/08306–20/08333;
(Continued)

(56) References Cited

U.S. PATENT DOCUMENTS 7,260,362 B2    8/2007  Teibel
7,730,036 B2    6/2010  Blose et al.
(Continued)

FOREIGN PATENT DOCUMENTS

CN    101489276 A    7/2009
CN    101681459 A    3/2010
(Continued)

OTHER PUBLICATIONS

Notice of Final Rejection and English Translation for Korean Patent Application No. 10-2014-7027236, dated Mar. 8, 2016, 5 pages.
(Continued)

*Primary Examiner* — Brendan Higa
(74) *Attorney, Agent, or Firm* — Barnes & Thornburg LLP

(57) ABSTRACT

A method, device, and system for selecting one or more devices and users to capture and share images of an event with other users includes establishing one or more ad-hoc groups with a resource management server. The resource management server communicates with one or more computing devices over a network to assign the computing devices to an ad-hoc group as a function of one or more users requesting to receive images captured at an event. For each ad-hoc group, the resource management server selects a device and a user to capture images of the event, which are distributed to the one or more users. Additionally, the computing devices may establish an ad-hoc group without the resource management server. A computing device of the ad-hoc group is selected to capture images of the event, which are distributed to users of the ad-hoc group through an ad-hoc network.

23 Claims, 8 Drawing Sheets

(51) Int. Cl.
*G06Q 10/06* (2012.01)
*H04L 12/18* (2006.01)

(52) U.S. Cl.
CPC .... *H04L 29/08333* (2013.01); *H04L 67/1046* (2013.01); *H04L 12/1845* (2013.01)

(58) Field of Classification Search
CPC .................. H04L 67/104–67/1046; G06Q 10/0631–10/06315; G06Q 10/1097; G06Q 50/01
See application file for complete search history.

(56) References Cited

U.S. PATENT DOCUMENTS

| | | | |
|---|---|---|---|
| 8,943,140 B1* | 1/2015 | Kothari | H04L 65/403 709/203 |
| 2005/0193421 A1 | 9/2005 | Cragun | |
| 2006/0031089 A1* | 2/2006 | Tarr | G06Q 10/06311 705/7.13 |
| 2006/0218225 A1 | 9/2006 | Hee Voon et al. | |
| 2006/0242234 A1 | 10/2006 | Counts et al. | |
| 2011/0099089 A1* | 4/2011 | Wolfram | G06Q 30/06 705/27.1 |
| 2011/0258275 A1 | 10/2011 | Rao | |

FOREIGN PATENT DOCUMENTS

| | | |
|---|---|---|
| CN | 101702791 A | 5/2010 |
| CN | 101854312 A | 10/2010 |
| KR | 2007-0054571 A | 5/2007 |
| WO | 2013147902 A1 | 10/2013 |

OTHER PUBLICATIONS

Go, Gwang-Tae, et al., "A Scalable Content-Based Routing Scheme Considering Group Mobility in Tactical Mobile Ad-hoc Netowrks," published by Korean Institute of Communication and Information Services, vol. 35, No. 5 (May 2010).

International Search Report and Written Opinion received for International Patent Application No. PCT/US2012/031746, dated Oct. 29, 2012, 9 pages.

"Bump (application)," Wikipedia, The Free Encyclopedia, available: [http://en.wikipedia.org/wiki/Bump_(application)], Feb. 2012, 2 pages.

Ko, Kwangtae, et al., "A Scalable Content-Based Routing Scheme Considering Group Mobility in Tactical Mobile Ad-hoc Networks," vol. 35, No. 5, 13 pages.

Notice of Preliminary Rejection for Korean Patent Application No. 10-2014-7027236, dated Aug. 31, 2015, 9 pages.

Office Action for Chinese Patent Application No. 201280072120.1, dated Nov. 2, 2016, 5 pages.

* cited by examiner

METHOD, DEVICE, AND SYSTEM FOR AD-HOC RESOURCE SELECTION

BACKGROUND

Digital photography has become an increasingly popular way to capture images of events and social gatherings. As such, it is not uncommon for multiple people at an event to capture similar images of the event using one or more digital cameras or computing devices having an integrated camera. For instance, it is not uncommon for multiple people at an event to capture an image of the same subject at a similar point in time using each of their various digital cameras. Additionally, due to varying factors such as, for example, the angle of capture, the lighting of the subject, the features and capabilities of the various digital cameras, the experience of the photographer, and/or other variables, an image captured by one person may differ greatly from an image captured by another person. As a result, an image captured by one person of a particular subject may be of a much higher quality than a corresponding image captured by another person.

In order to reduce the total number of separate images captured and, in some instances, to increase the quality and management of images captured at an event, family members and groups of friends often designate one person to capture images of the event. The person designated is typically either the family member or friend most experienced in capturing images or the family member or friend having the image capture device capable of capturing the highest quality of images. However, at the conclusion of the event, the designated person often forgets to share the captured images with their family or friends or decides not to follow through with sharing the captured images with one or more people. This becomes even more of an issue when a group of acquaintances (e.g., parents of a class of fifth graders acting in a play), or even a group of complete strangers (e.g., a group of people spotting a bear in Yellowstone), designate one person to capture images for the group.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
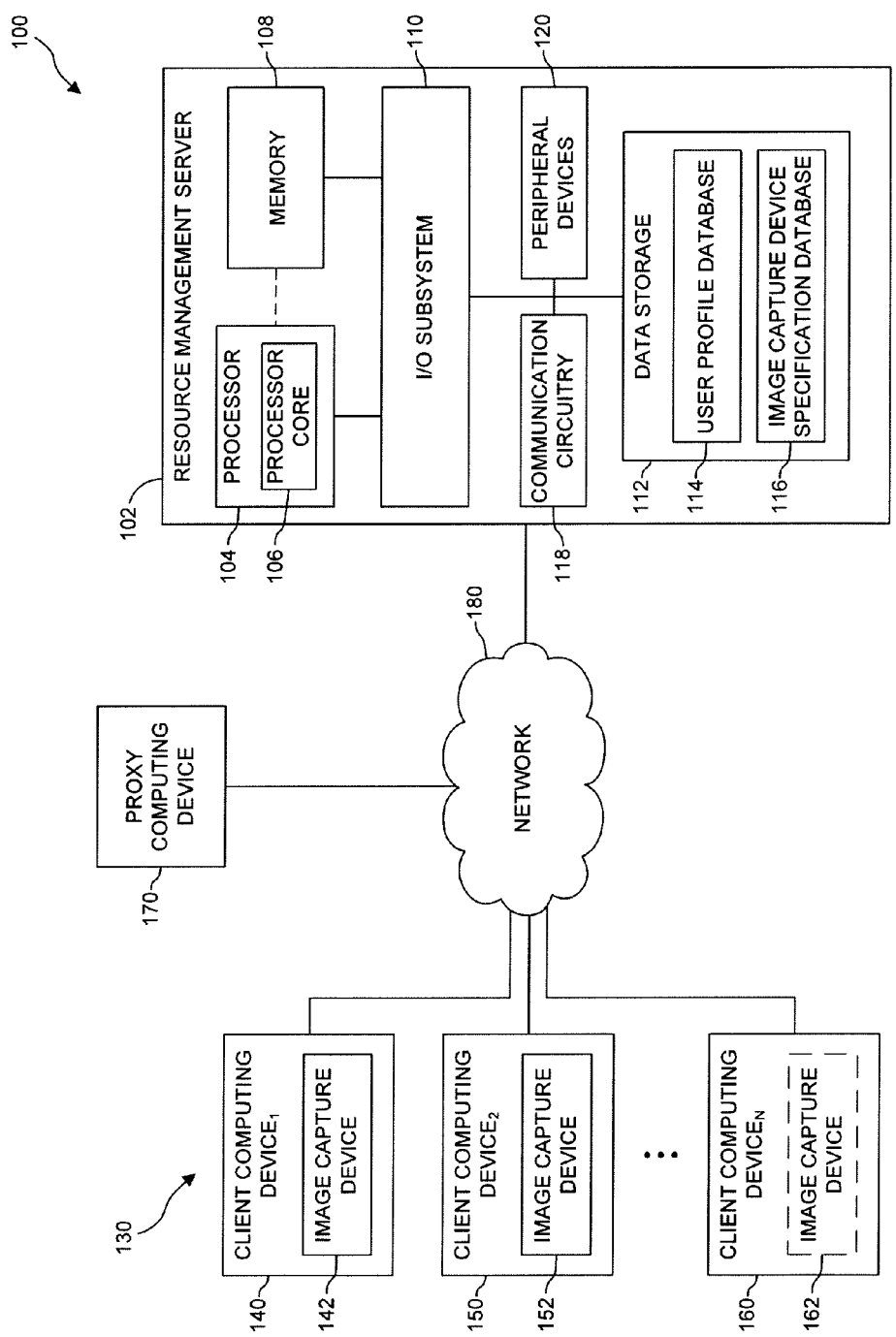
FIG. 1 is a simplified block diagram of at least one embodiment of a system for establishing an ad-hoc group for sharing resources between computing devices.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, a system 100 for establishing an ad-hoc group for sharing resources amongst computing devices includes a resource management server 102, one or more client computing devices 130, and a communications network 180. As discussed in more detail below, the system 100 may additionally include a proxy computing device 170. In some embodiments, the resource management server 102 may establish one or more ad-hoc groups, each of which may correspond to an upcoming and/or presently occurring event or gathering. For example, the resource management server 102 may establish one ad-hoc group corresponding to a particular sporting event and another ad-hoc group corresponding to birthday party. It should be understood, however, that the resource management server 102 may establish any number of ad-hoc groups for any number of events or gatherings, both present and future.

In some embodiments, each ad-hoc group comprises one or more users exhibiting a desire to share images captured at a particular event. As such, the resource management server 102 may group or otherwise assemble one or more users having a common interest in sharing images captured from a particular event into an ad-hoc group established for that particular event. In some embodiments, each of the users (e.g., members) of the ad-hoc group may be participants and/or attendees of the particular event. In such embodiments, the resource management server 102 may select a user of the ad-hoc group to capture images (e.g., take pictures) of the event to be shared with the remaining users of the ad-hoc group. In doing so, the resource management server 102 may select a user to capture images of the event using an image capture device such as, for example, the image capture device 142 of the CLIENT COMPUTING $DEVICE_1$ 140, which may be associated with the selected user. It should be understood, however, that the resource management server 102 may select more than one user of the ad-hoc group (e.g., a back-up user) to capture images of the event.

Upon selecting the user to capture images of the event, the resource management server 102 may notify the user of the selection via one or more web pages, application messages, user interfaces, text messages, email messages, or any other suitable type of notification displayable on the CLIENT COMPUTING $DEVICE_1$ 140. For example, the resource management server 102 may generate a message to an application executing on the CLIENT COMPUTING $DEVICE_1$ 140.

At the conclusion of the event or any time prior to the conclusion, the resource management server 102 may, in some embodiments, automatically receive the images captured by the selected user via the image capture device 142. Thereafter, the resource management server 102 may distribute the captured photos to the remaining users of the ad-hoc group. In that way, the number of users capturing images of a particular event may be reduced and the likelihood that a particular user will forget to distribute copies of the captured images may also be reduced.

As discussed above, the system 100 may additionally include the proxy computing device 170. In some embodiments, one or more users of the ad-hoc group may be associated with an image capture device incapable of communicating with the resource management server 102 over the network 180. In other embodiments, one or more users of the ad-hoc group may have forgotten to bring their image capture device to the event. In such embodiments, the one or more users may still like to participate in the ad-hoc group (e.g., receive a copy of the images captured at the event, contribute images captured by a traditional image capture device, etc.). To do so, the proxy computing device 170 may be utilized by the one or more users on behalf of another device to participate in the ad-hoc group. In that way, the proxy computing device 130 may enable a user to still receive copies of the images captured at an event even though they forgot to bring an image capture device to the event or disabled communications on their image capture device to, for example, conserve battery power.

The resource management server 102 may be embodied as any type of server computing device for processing data and communicating with remote devices. In the illustrative embodiment of FIG. 1, the resource management server 102 includes a processor 104, an I/O subsystem 110, a memory 108, a data storage 112, communication circuitry 118, and one or more peripheral devices 120. In some embodiments, several of the foregoing components may be incorporated on a motherboard of the resource management server 102, while other components may be communicatively coupled to the motherboard via, for example, a peripheral port.

Furthermore, it should be appreciated that the resource management server 102 may include other components, sub-components, and devices commonly found in a computing device, which are not illustrated in FIG. 1 for clarity of the description.

The processor 104 of the resource management server 102 may be embodied as any type of processor capable of executing software/firmware, such as a microprocessor, digital signal processor, microcontroller, or the like. The processor 104 is illustratively embodied as a single core processor having a processor core 106. However, in other embodiments, the processor 104 may be embodied as a multi-core processor having multiple processor cores 106. Additionally, the resource management server 102 may include additional processors 104 having one or more processor cores 106.

The I/O subsystem 110 of the resource management server 102 may be embodied as circuitry and/or components to facilitate input/output operations with the processor 104 and/or other components of the resource management server 102. In some embodiments, the I/O subsystem 110 may be embodied as a memory controller hub (MCH or "northbridge"), an input/output controller hub (ICH or "southbridge"), and a firmware device. In such embodiments, the firmware device of the I/O subsystem 110 may be embodied as a memory device for storing Basic Input/Output System (BIOS) data and/or instructions and/or other information (e.g., a BIOS driver used during booting of the resource management server 102). However, in other embodiments, I/O subsystems having other configurations may be used. For example, in some embodiments, the I/O subsystem 110 may be embodied as a platform controller hub (PCH). In such embodiments, the memory controller hub (MCH) may be incorporated in or otherwise associated with the processor 104, and the processor 104 may communicate directly with the memory 108 (as shown by the hashed line in FIG. 1). Additionally, in other embodiments, the I/O subsystem 110 may form a portion of a system-on-a-chip (SoC) and be incorporated, along with the processor 104 and other components of the resource management server 102, on a single integrated circuit chip.

The processor 104 is communicatively coupled to the I/O subsystem 110 via a number of signal paths. These signal paths (and other signal paths illustrated in FIG. 1) may be embodied as any type of signal paths capable of facilitating communication between the components of the resource management server 102. For example, the signal paths may be embodied as any number of wires, cables, light guides, printed circuit board traces, via, bus, intervening devices, point-to-point interconnects, and/or the like.

The memory 108 of the resource management server 102 may be embodied as, or otherwise include, one or more memory devices or data storage locations including, for example, dynamic random access memory devices (DRAM), synchronous dynamic random access memory devices (SDRAM), double-data rate synchronous dynamic random access memory device (DDR SDRAM), mask readonly memory (ROM) devices, erasable programmable ROM (EPROM), electrically erasable programmable ROM (EEPROM) devices, flash memory devices, and/or other volatile and/or non-volatile memory devices. The memory 108 is communicatively coupled to the I/O subsystem 110 via a number of signal paths. Although only a single memory device 108 is illustrated in FIG. 1, the resource management server 102 may include additional memory devices in other embodiments. Various data and software may be stored in the memory device 108. For example, one or more operating systems (OS), applications, programs, libraries, and drivers that make up the software stack executed by the processor 104 may reside in memory 108 during execution.

The data storage 112 may be embodied as any type of device or devices configured for the short-term or long-term storage of data such as, for example, memory devices and circuits, memory cards, hard disk drives, solid-state drives, or other data storage devices. In some embodiments, the data storage 112 may be used to store data associated with one or more users or image capture devices. To do so, the data storage 112 may include one or more databases such as, for example, a user profile database 114 and an image capture device specification database 116. In such embodiments, the user profile database 114 may comprise data associated with a user's account (e.g., user name, password, security questions, contact information, delivery preferences, privacy preferences, etc.) or distinguishing characteristics of the user (user-defined strengths and weaknesses, system generated strengths and weaknesses, etc.). The image capture device specification database 116 may comprise data and/or specifications associated with one or more image capture devices (e.g., device features, device settings, lens focal lengths, apertures, lens optical quality, focus settings, resolutions, quantity of megapixels, sensor types, shutter speeds, film speeds, flash types, flash compensation settings, device battery level, attached accessory types, filter types, etc.). For example, in some embodiments, the image capture device specification database 116 may store specifications associated the image capture devices 142, 152, 162 of the client computing devices 140, 150, 160.

The communication circuitry 118 of the resource management server 102 may be embodied as any number of devices and circuitry for enabling communications between the resource management server 102 and the client computing devices 130 over the network 180. For example, the communication circuitry 118 may be embodied as a network interface controller (NIC) in some embodiments. The network 180 may be embodied as any number of various wired and/or wireless communication networks. For example, the network 180 may be embodied as or otherwise include a local area network (LAN), a wide area network (WAN), a mobile network, or a publicly-accessible, global network such as the Internet. Additionally, the network 180 may include any number of additional devices to facilitate communication between the resource management server 102 and the client computing devices 130. The resource management server 102 and the client computing devices 130 may use any suitable communication protocol to communicate with each other over the network 180 depending on, for example, the particular type of network(s) 180.

The peripheral devices 120 of the resource management server 102 may include any number of additional input/output devices, interface devices, and/or other peripheral devices. For example, the peripheral devices 120 may include a display for displaying content to a user, a keyboard, mouse, or other input/output peripheral device. The peripheral devices 120 are communicatively coupled to the I/O subsystem 110 via a number of signal paths thereby allowing the I/O subsystem 110 and/or processor 104 to receive inputs from and send outputs to the peripheral devices 120.

The client computing devices 130 may be embodied as any type of computing device capable of performing the functions described herein. As such, the client computing devices 130 may include various hardware and software components (e.g., a processor, memory, and communication circuitry) typically found in a computing device for communicating, storing, maintaining, and transferring data (e.g., requests, captured images, etc.) over the network 180. Additionally, in some embodiments the client computing devices 130 may include an image capture device (e.g., the image capture device 142 of CLIENT COMPUTING DEVICE$_1$ 140, the image capture device 152 of CLIENT COMPUTING DEVICE$_2$ 150, and the image capture device 152 of CLIENT COMPUTING DEVICE$_N$ 160) for capturing images of an event. It should be understood, however, that one or more of the client computing devices 130 may not include an image capture device in some embodiments. For example, in the illustrative embodiment of FIG. 1, the CLIENT COMPUTING DEVICE$_N$ 160 may optionally include (as shown by the hashed outline in FIG. 1) the image capture device 162. In some embodiments, the image capture devices 142, 152, 162 may be embodied as one or more digital cameras (e.g., a digital point-and-shoot camera, a digital single-lens reflex (DSLR) camera, a smart phone camera, a tablet camera, or any other type of camera and/or computing device having an integrated camera).

Additionally or alternatively, in some embodiments, the client computing devices 130 may include a location device for determining a current location (e.g., latitude, longitude, altitude, city, state, region, etc.) of the client computing devices 130. For example, in some embodiments, one or more of the client computing devices 130 may include a global positioning system (GPS) device to determine a current location. It should be understood, however, that the one or more client computing devices 130 may, additionally or alternatively, include any number of other devices suitable for determining a current location.

The proxy computing device 170 may be embodied as any type of computing device capable of performing the functions described herein. As such, the proxy computing device 170 may include various hardware and software components (e.g., a processor, memory, and communication circuitry) typically found in a computing device for communicating, storing, maintaining, and transferring data (e.g., requests, captured images, etc.) over the network 180 on behalf of another device. In some embodiments, the proxy computing device 170 may be represented by an email address that indicates that the user does not have an image capture device, but would still like to receive copies of one or more images captured at the event.

Figure 2:
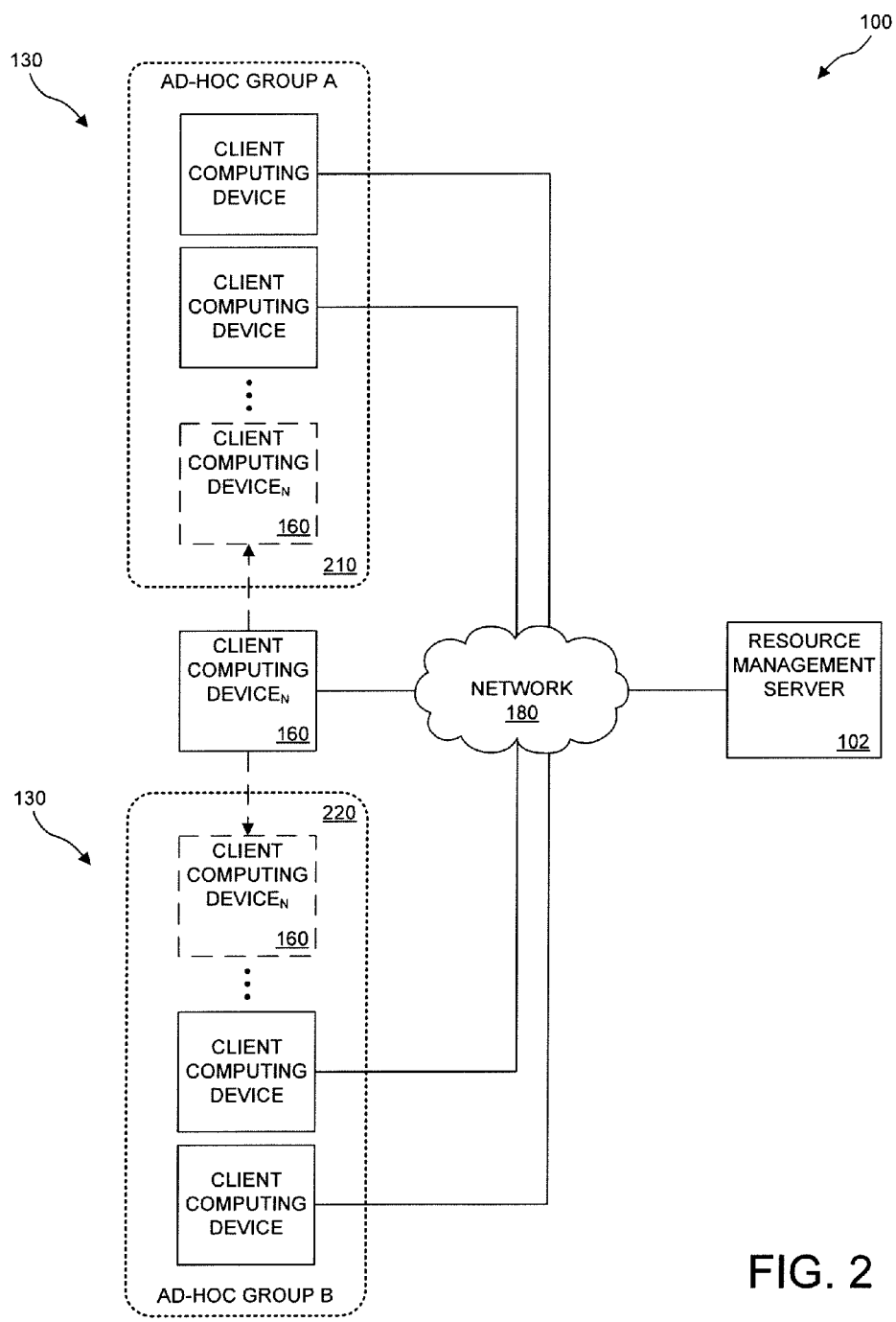
FIG. 2 is a simplified block diagram of at least one embodiment of a system for assigning a computing device to an ad-hoc group with the resource management server of FIG. 1.

As discussed above, the resource management server 102 may establish, in some embodiments, one or more ad-hoc groups. Each ad-hoc group may correspond to an upcoming and/or presently occurring event or gathering. For example, referring now to FIG. 2, the resource management server 102 may establish AD-HOC GROUP A 210 and AD-HOC GROUP B 220. It should be understood that although AD-HOC GROUP A 210 and AD-HOC GROUP B 220 are described in the illustrative embodiment, the resource management server 102 may establish any number of ad-hoc groups as a function of one or more upcoming and/or presently occurring events or gatherings.

In some embodiments, AD-HOC GROUP A 210 and AD-HOC GROUP B 220 may each include any number of the client computing devices 130 and the corresponding users. Each of the client computing devices 130 may communicate with the resource management server 102 over the network 180. In such embodiments, the resource management server 102 may receive a request from one or more of the client computing devices 130 to join a particular group. For example, the resource management server 102 may receive a request from the CLIENT COMPUTING DEVICE$_N$ 160 to join AD-HOC GROUP A 210 or AD-HOC GROUP B 220 and share images captured at an event or gathering with the one or more client computing devices 130 in the particular group to be joined. In response to receiving such a request, the resource management server 102 may assign the CLIENT COMPUTING DEVICE$_N$ 160 to the requested ad-hoc group. In doing so, resource management server 102 may thereafter notify the CLIENT COMPUTING DEVICE$_N$ 160 of the successful assignment.

Additionally or alternatively, the resource management server 102 may receive, in some embodiments, a request to join an ad-hoc group corresponding to an event or gathering occurring within a reference range of the one or more client computing devices 130. In such embodiments, the resource management server 102 may receive data indicative of the location of the one or more client computing devices 130 and thereafter determine one or more events occurring within a reference range. For example, the received request may comprise specific location data (e.g., latitude, longitude, address, city, state, region, etc.) corresponding to the current location of the CLIENT COMPUTING DEVICE$_N$ 160. It should be understood, however, that the request may instead comprise data indicative of the current location of the CLIENT COMPUTING DEVICE$_N$ 160. For example, the request may include data indicating a signal strength between the CLIENT COMPUTING DEVICE$_N$ 160 and one or more base transceiver stations of a mobile network. In such embodiments, the resource management server 102 may calculate the location of the CLIENT COMPUTING DEVICE$_N$ 160 from the location data included in the request.

Upon determining the location of the one or more client computing devices 130, the resource management server 102 may determine an event occurring nearby (e.g., within 10 feet, 100 yards, 2 miles, etc.) as a function of location information corresponding to one or more of the other client computing devices 130. To do so, the resource management server 102 may compare the location of the one or more client computing devices 130 to the locations of other computing devices already assigned to an ad-hoc group. In such embodiments, the resource management server 102 may determine that one or more of the client computing devices 130 such as, for example, CLIENT COMPUTING DEVICE$_N$ 160 is located within a reference range of one or more other client computing devices 130. In response to making such a determination, the resource management server 102 may assign the CLIENT COMPUTING DEVICE$_N$ 160 to the same ad-hoc group (e.g., AD-HOC GROUP A 210) that the one or more other nearby client computing devices 130 are assigned.

Additionally or alternatively, in some embodiments, the resource management server 102 may determine an event occurring nearby (e.g., within 10 feet, 100 yards, 2 miles, etc.) as a function of event information (e.g., an event description, an event time and date, a location of an event, etc.) obtained from an event information server over the network 180. To do so, the resource management server 102 may compare the locations of the one or more client computing devices 130 to the event locations obtained from the event information server. In such embodiments, the resource management server 102 may determine that one or more of the client computing devices 130 such as, for example, CLIENT COMPUTING DEVICE$_N$ 160 is located within a reference range of one or more events obtained from the event information server. Subsequently, the resource management server 102 may assign the one or more client computing devices 130 to an ad-hoc group corresponding to the one or more events. For example, the resource management server 102 may determine that the CLIENT COMPUTING DEVICE$_N$ 160 may be located closest to a particular sporting event. In response to making such a determination, the resource management server 102 may assign the CLIENT COMPUTING DEVICE$_N$ 160 to an ad-hoc group (e.g. AD-HOC GROUP A 210) established for that particular sporting event.

Subsequent to assigning the one or more client computing devices 130 to one or more ad-hoc groups (e.g., AD-HOC GROUP A 210, AD-HOC GROUP B 220, etc.), the resource management server 102 may notify the client computing devices 130 of the successful assignments. To do so, the resource management server 102 may send each of the client computing devices 130 notification via one or more web pages, application messages, user interfaces, text messages, email messages, signals, or any other suitable type of notification displayable on the client computing devices 130. For example, the resource management server 102 may generate a message to an application executing on the CLIENT COMPUTING DEVICE$_N$ 160.

As discussed in the illustrative embodiments above, the client computing devices 130 communicates with the resource management server 102 over the network 180. In such embodiments, the resource management server 102 assigns each of the client computing devices 130 to an ad-hoc group as a function determining one or more events or gatherings occurring within a reference range. Additionally, the resource management server 102 selects one or more users of each ad-hoc group to capture images (e.g., take pictures) of an event to be shared with the remaining members of the group. In doing so, the resource management server 102 communicates with (e.g., notifies) each member of each ad-hoc group of the selection via the network 180. Subsequently, the resource management server 102 receives the images captured by the selected user for each ad-hoc group and automatically distributes those images to the remaining members of the group.

Figure 3:
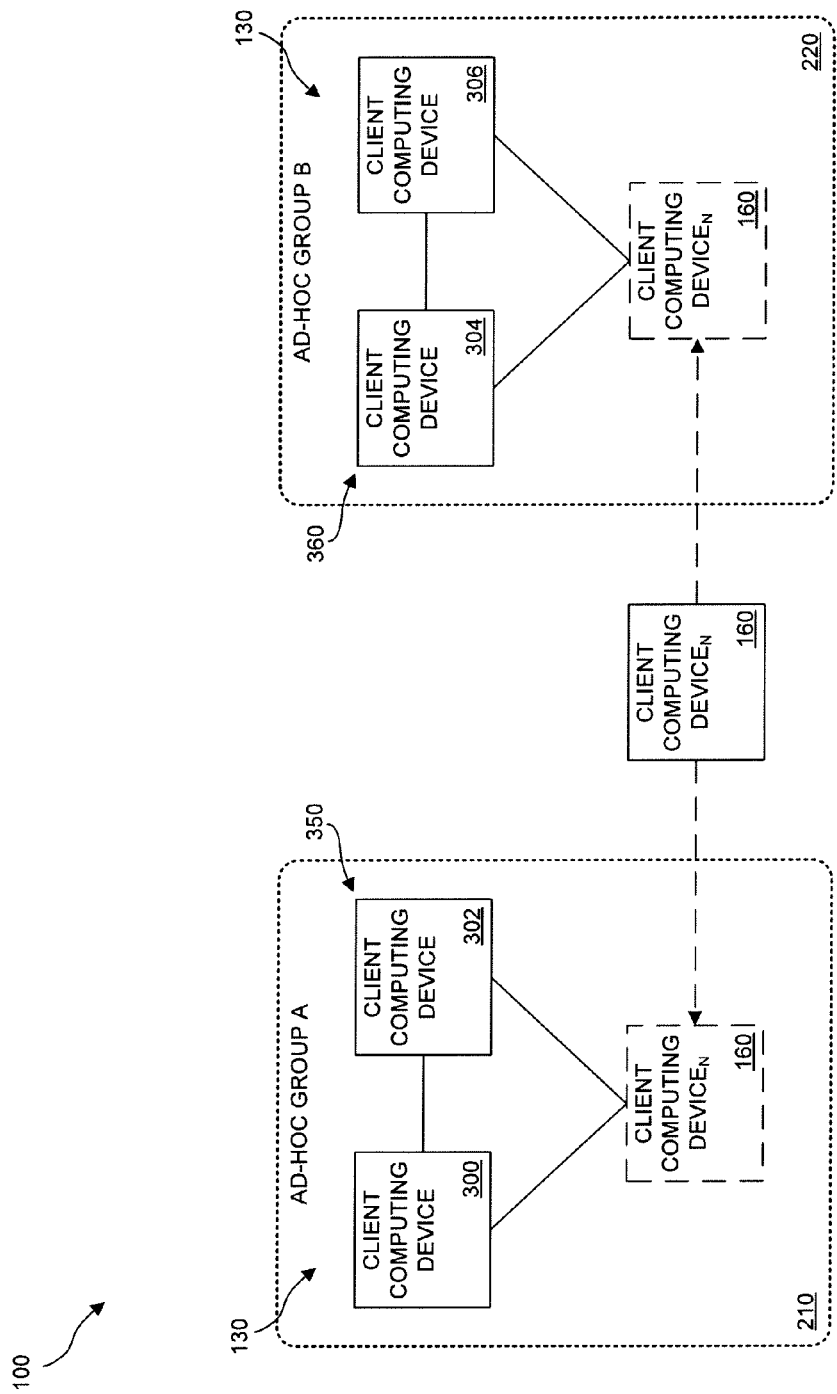
FIG. 3 is a simplified block diagram of at least one embodiment of a system for joining a computing device to an ad-hoc group using an ad-hoc network.

It should be understood, however, that in some embodiments, the client computing devices 130 may establish and join one or more ad-hoc groups without communicating with the resource management server 102 over the network 180. Instead, the one or more client computing devices 130 may establish one or more ad-hoc groups via one or more ad-hoc networks. For example, as shown in FIG. 3, the resource management server 102 may not be included in the system 100 in some embodiments. In such embodiments, the system 100 may instead include the one or more client computing devices 130 and one or more ad-hoc groups (e.g., AD-HOC GROUP A 210 and AD-HOC GROUP B 220). It should be understood that although AD-HOC GROUP A 210 and AD-HOC GROUP B 220 are described in the illustrative embodiment, the system 100 may include any number of ad-hoc groups as a function of one or more upcoming and/or presently occurring events or gatherings.

In some embodiments, the AD-HOC GROUP A 210 and the AD-HOC GROUP B 220 may each include any number of the client computing devices 130. For example, the AD-HOC GROUP A 210 may include a portion 350 (e.g., client computing devices 300, 302) of the client computing devices 130 and the AD-HOC GROUP B 220 may include a different portion 360 (e.g., client computing devices 304, 306) of the client computing devices 130. Each of the ad-hoc groups 210, 220 may include an ad-hoc network established to facilitate communications between the client computing devices 300, 302, 304, 306 of each group.

As discussed above, one or more of the client computing devices 130 may additionally join an ad-hoc group without communicating with the resource management server 102. For example, the CLIENT COMPUTING DEVICE$_N$ 160 may join the AD-HOC GROUP A 210 or the AD-HOC GROUP B 220. Upon joining an ad-hoc group, the CLIENT COMPUTING DEVICE$_N$ 160 may communicate with the other client computing devices 130 of the group using an ad-hoc network such as, for example, a wireless mesh network. For example, in some embodiments the CLIENT COMPUTING DEVICE$_N$ 160 may join the AD-HOC GROUP A 210 and communicate with each of the client computing devices 300, 302 using the wireless mesh network. It should be understood that although a wireless mesh network is described in the illustrative embodiment, other types of networks may be utilized to facilitate communications between client computing devices 130 within an ad-hoc group. For example, in some embodiments, a peer-to-peer network may be utilized for intra-group communications.

Upon establishing an ad-hoc group (e.g., AD-HOC GROUP A 210), the one or more client computing devices 350 may negotiate which client computing device 300, 302, 160 should manage operations for the group. To do so, one or more of the client computing devices 300, 302, 160 may volunteer to serve as the group manager in some embodiments. Additionally or alternatively, the one or more client computing devices 350 may elect one of the client computing devices 300, 302, 160 to serve as the group manager as a function of comparing which of the client computing devices 300, 302, 160 comprises the most processing power, memory, storage, battery power, and/or any other characteristic suitable in determining an optimal client computing device. As discussed in greater detail below, the client computing device 300, 302, 160 acting as the manager for the ad-hoc group (e.g., AD-HOC GROUP A 210), selects one or more users to capture images (e.g., take pictures) of an event to be shared with the remaining members of the group. In some embodiments, the client computing device 300, 302, 160 acting as the manager (e.g., the group leader) of the ad-hoc group may receive the images captured by the selected user and distribute the images to the remaining members of the group. For example, in an embodiment, the client computing device 300 may be elected as the leader for the AD-HOC GROUP A 210. As a result, the client computing device 300 may select the client computing device 302 to capture images of an event for the group. At the conclusion of the event, or sometime during the event, the client computing device 300 may receive the captured images from the client computing device 302. Thereafter, the client computing device 300 may distribute the captured images to the remaining members (e.g., CLIENT COMPUTING DEVICE$_N$ 160) of the AD-HOC GROUP A 210.

Figure 4:
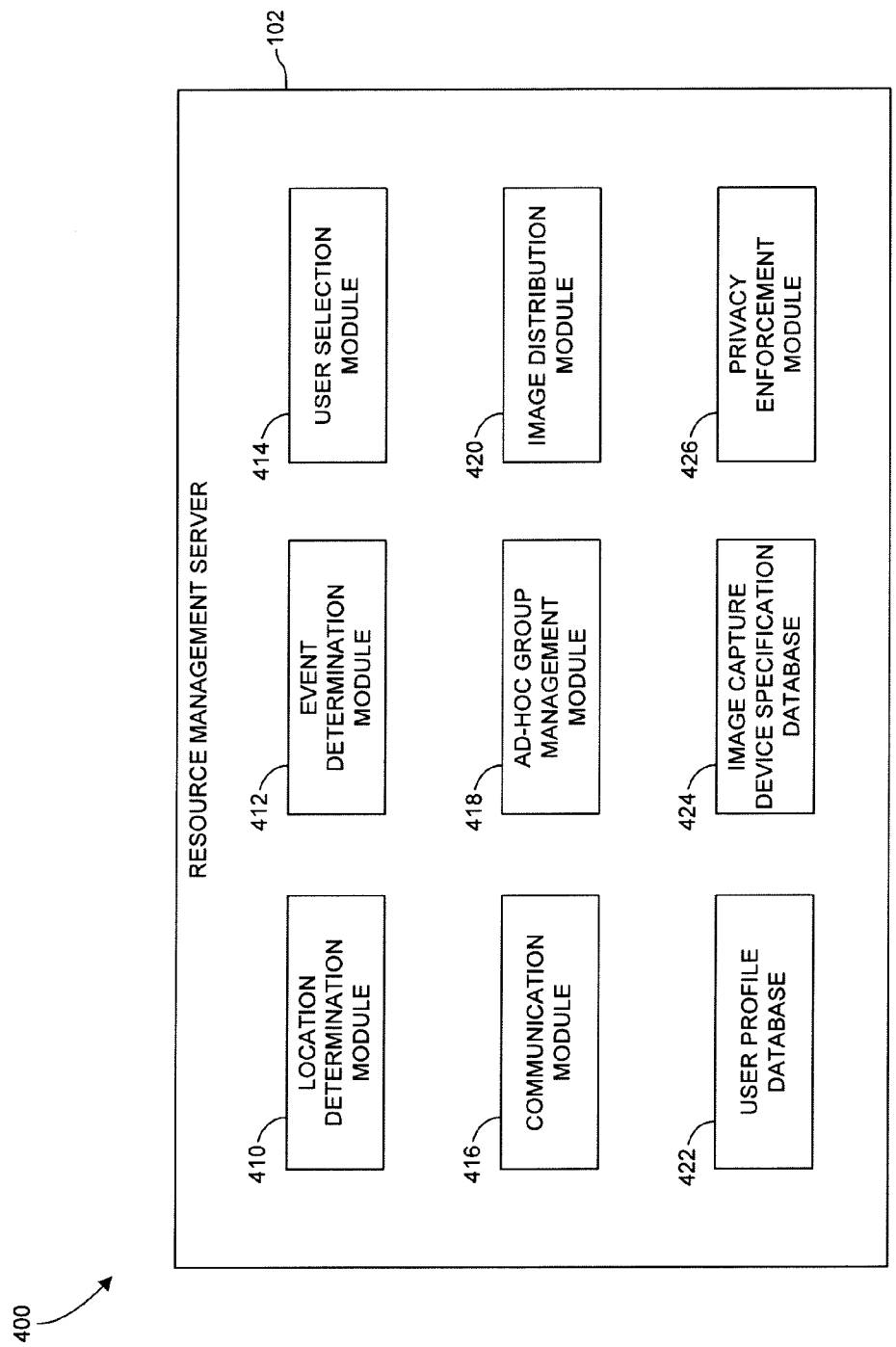
FIG. 4 is a simplified block diagram of at least one embodiment of an environment of the resource management server of the system of FIGS. 1 and 2.

Referring now to FIG. 4, an environment 400 of the resource management server 102 includes a communication module 416, an ad-hoc group management module 418, a user profile database 422, an image capture device specification database 424, a user selection module 414, a location determination module 410, an event determination module 412, an image distribution module 420, and a privacy enforcement module 426. It should be understood that the environment 400, and/or any of the modules included therein, may be implemented in hardware, firmware, software, or any combination thereof.

As discussed above, in some embodiments, the resource management server 102 may facilitate assigning the one or more client computing devices 130 to one or more ad-hoc groups (e.g., AD-HOC GROUP A 210 or AD-HOC GROUP B 220) established for sharing images captured at an event.

To do so, the communication module 416 may facilitate communications with the one or more client computing devices 130 over the network 180. Additionally, the communication module 416 of the resource management server 102 and the client computing devices 130 may use any suitable communication protocol to communicate with each other over the network 180 depending on, for example, the particular type of network(s) 180.

The ad-hoc group management module 418 may establish one or more ad-hoc groups. Each ad-hoc group may correspond to an upcoming and/or presently occurring event or gathering. For example, the ad-hoc group management module 418 may establish one ad-hoc group corresponding to a particular sporting event and another ad-hoc group corresponding to a birthday party. It should be understood, however, that the ad-hoc group management module 418 may establish any number of ad-hoc groups for any number of events or gatherings, both present and future.

In some embodiments, the communication module 416 may receive a request from one or more of the client computing devices 130 to join a particular ad-hoc group. In response to receiving such a request, the ad-hoc group management module 418 may assign the one or more client computing devices 130 to the requested group. For example, the communication module 416 may receive a request from the CLIENT COMPUTING DEVICE$_N$ 160 to join AD-HOC GROUP A 210 and share images captured at an event or gathering with the one or more other client computing devices 130 in the group. In response to receiving such a request, the ad-hoc group management module 418 may assign the CLIENT COMPUTING DEVICE$_N$ 160 to the requested ad-hoc group (e.g., AD-HOC GROUP A 210). Additionally, in some embodiments, the ad-hoc group management module 418 may notify the one or more client computing devices 130 of the successful group assignment.

Additionally or alternatively, the communication module 416 may instead receive a request to join an ad-hoc group corresponding to an event or gathering occurring within a reference range of one of the client computing devices 130 such as, for example, CLIENT COMPUTING DEVICE$_N$ 160. To do so, the ad-hoc group management module 418 may determine that the CLIENT COMPUTING DEVICE$_N$ 160 is located within a reference range to another one of the client computing devices 130, which may have already been assign to an ad-hoc group for an event. In some embodiments, however, the ad-hoc group management module 418 may instead determine that the CLIENT COMPUTING DEVICE$_N$ 160 is located within a reference range of an event or gathering occurring nearby as a function of event information (e.g., an event description, an event time and date, a location of an event, etc.) obtained from an event information server over the network 180. Regardless, in response to making such determinations, the ad-hoc group management module 418 may assign the CLIENT COMPUTING DEVICE$_N$ 160 to an ad-hoc group (e.g. AD-HOC GROUP A 210) established for a particular event.

To facilitate determining whether the one or more client computing devices 130 is located within a reference range to a currently occurring event or gathering, the location determination module 410 may analyze data indicative of the location of the one or more client computing devices 130. For example, in some embodiments, the communication module 416 may receive data corresponding to a specific location (e.g., latitude, longitude, address, city, state, region, etc.) included with a request to join an ad-hoc group. However, the communication module 416 may also receive data indicative of the current location (e.g., a signal strength between the one or more client computing devices 130 and one or more base transceiver stations of a mobile network) included with the request to join an ad-hoc group rather than specific location information. In such embodiments, the location determination module 410 may calculate the location of the one or more client computing devices 130 from the location data included in the request.

Additionally or alternatively, to facilitate determining a particular event or gathering currently occurring within a reference range of one or more of the client computing devices 130, the event determination module 412 may obtain event information (e.g., an event description, an event time and date, a location of an event, etc.) from an event information server over the network 180. In such embodiments, the ad-hoc group management module may 418 determine a particular event or gathering currently occurring within a reference range of one or more of the client computing devices 130 based on the information obtained by the event determination module 412 and the location determination module 410. It should be understood that in some embodiments, the event determination module 412 may utilize the location information included with the request to join an ad-hoc group or the location information calculated by the location determination module 410 to query or otherwise obtain only a portion of the event information from the event information server.

The user profile database 422 may comprise data associated with a user's account (e.g., user name, password, security questions, contact information, delivery preferences, privacy preferences, etc.). For example, the user profile database 422 may include preferences indicative of the destination (e.g., an email address, a mobile telephone number, a web page, an Internet Protocol address, a digital image frame, an image printer, a mobile application, a postal address, etc.) and/or the delivery format (e.g., email message, photo disc, web image, slideshow, mobile photo message, text message link, etc.). Additionally, in some embodiments, the user profile database 422 may include data indicative of one or more distinguishing characteristics of the user (user-defined strengths and weaknesses, system generated strengths and weaknesses, etc.). For example, the user profile database may comprise a user-defined expertise level in capturing images at particular types of events (e.g., capturing images at sporting events, capturing images at social gathering, capturing images of landscapes or flowers, capturing portrait images, etc.). The user profile database 422 may also include data indicative the quantity or quality of images a user has captured at a particular type of event or data indicative of another user's satisfaction level in images captured by the user at a particular type of event. It should be understood that the user profile database 422 may also comprise any other data indicative of the distinguishing characteristics of a user.

The image capture device specification database 424 may comprise data and/or specifications associated with one or more image capture devices (e.g., device features, device settings, lens focal lengths, apertures, lens optical quality, focus settings, resolutions, quantity of megapixels, sensor types, shutter speeds, film speeds, flash types, flash compensation settings, device battery level, attached accessory types, filter types, etc.). For example, in some embodiments, the image capture device specification database 424 may store specifications associated the image capture devices 142, 152, 162 of the client computing devices 140, 150, 160. It should be understood that image capture device specification database 424 may also comprise any other data indicative of the features, capabilities, and/or settings of the image capture devices 142, 152, 162 of the client computing devices 130.

To reduce the quantity of images captured at an event by multiple users, the user selection module 414 may select a user or users of the ad-hoc group to capture images (e.g., take pictures) of the event to be shared with the remaining users of the ad-hoc group. To do so, the user selection module 414 may obtain data indicative of one or more distinguishing characteristics of each user (user-defined strengths and weaknesses, system generated strengths and weaknesses, etc.) of the ad-hoc group from the user profile database 422. Upon obtaining such data, the user selection module 414 may compare the characteristics of each user of the ad-hoc group and determine the most optimal or the most experienced user to capture images of the particular event. To do so, the user selection module 414 may rank or otherwise order the users as a function of the one or more distinguishing characteristics of the users. Additionally, the user selection module 414 may also select more than one user of the ad-hoc group (e.g., a back-up user) to capture images of the event. In that way, the resource management server 102 may share the images captured by the back-up user in the event that either the originally selected user or the selected image capture device is unavailable to capture images during all or a portion of the event.

In addition to selecting a particular user to capture images of an event, the user selection module 414 may also select a client computing device and image capture device for use by the selected user to capture images of the event. For example, in some embodiments, the user selection module 414 may select the image capture device 162 and the CLIENT COMPUTING DEVICE$_N$ 160 for use by the selected user to capture images of the event. To do so, the user selection module 414 may obtain the data and/or specifications associated with each image capture device (e.g., device features, device settings, lens focal lengths, apertures, lens optical quality, focus settings, resolutions, quantity of megapixels, sensor types, shutter speeds, film speeds, flash types, flash compensation settings, device battery level, attached accessory types, filter types, etc.) of the ad-hoc group from the image capture device specification database 424. Upon obtaining such data, the user selection module 414 may compare the specifications and/or features of each of the image capture devices in the ad-hoc group to determine the most optimal, the highest quality, or the most reliable image capture device to be used by the selected user to capture images of the particular event. To do so, the user selection module 414 may rank or otherwise order the image capture devices as a function of the one or more specifications associated therewith. It should be appreciated that, in such embodiments, the selected client computing device and image capture device may already be devices owned and operated by the selected user or they may be devices owned by another user. That is, the user selection module 414 may select the selected user's own client computing device/image capture device pair for use, or the user selection module 414 may select a different client computing device/image capture device pair for use.

In some embodiments, the user selection module 414 may notify the users of the ad-hoc group of the users and devices selected. To do so, the user selection module 414 may notify the ad-hoc group users via one or more web pages, application messages, user interfaces, text messages, email messages, or any other suitable type of notification displayable on the one or more client computing devices 130 of the users.

The privacy enforcement module 426 may enforce one or more privacy settings for each user of an ad-hoc group. As discussed above, the user profile database 422 may include data indicative of each user's privacy preferences. In some embodiments, the user profile database 422 may comprise one or more user-defined rules or settings that specify an amount of information that may be disclosed to other members of an ad-hoc group. For example, in some embodiments, the user profile database 422 may comprise one or rules or settings that indicate that the selected user does not want their exact location (e.g., latitude, longitude, address of current location, etc.) to be disclosed to other group members. Rather, the one or more user-defined rules or settings associated with the selected user may specify that only their current city, state, or event should be disclosed to other users. Additionally or alternatively, the one or more user-defined rules or settings associated with the selected user may specify that one or more of the captured images should be anonymously shared with the other users (e.g., without disclosing the identity of the selected user). It should be appreciated that the user profile database 422 may include rules indicating that either a portion or all of a user's personal information should be kept private. In that way, each user may specify one or more privacy preferences in a granular manner. In operation, the privacy enforcement module 426 may enforce the one or more privacy settings for each user from the user profile database 422 to prevent personal information from being displayed or otherwise disclosed.

Figure 5:
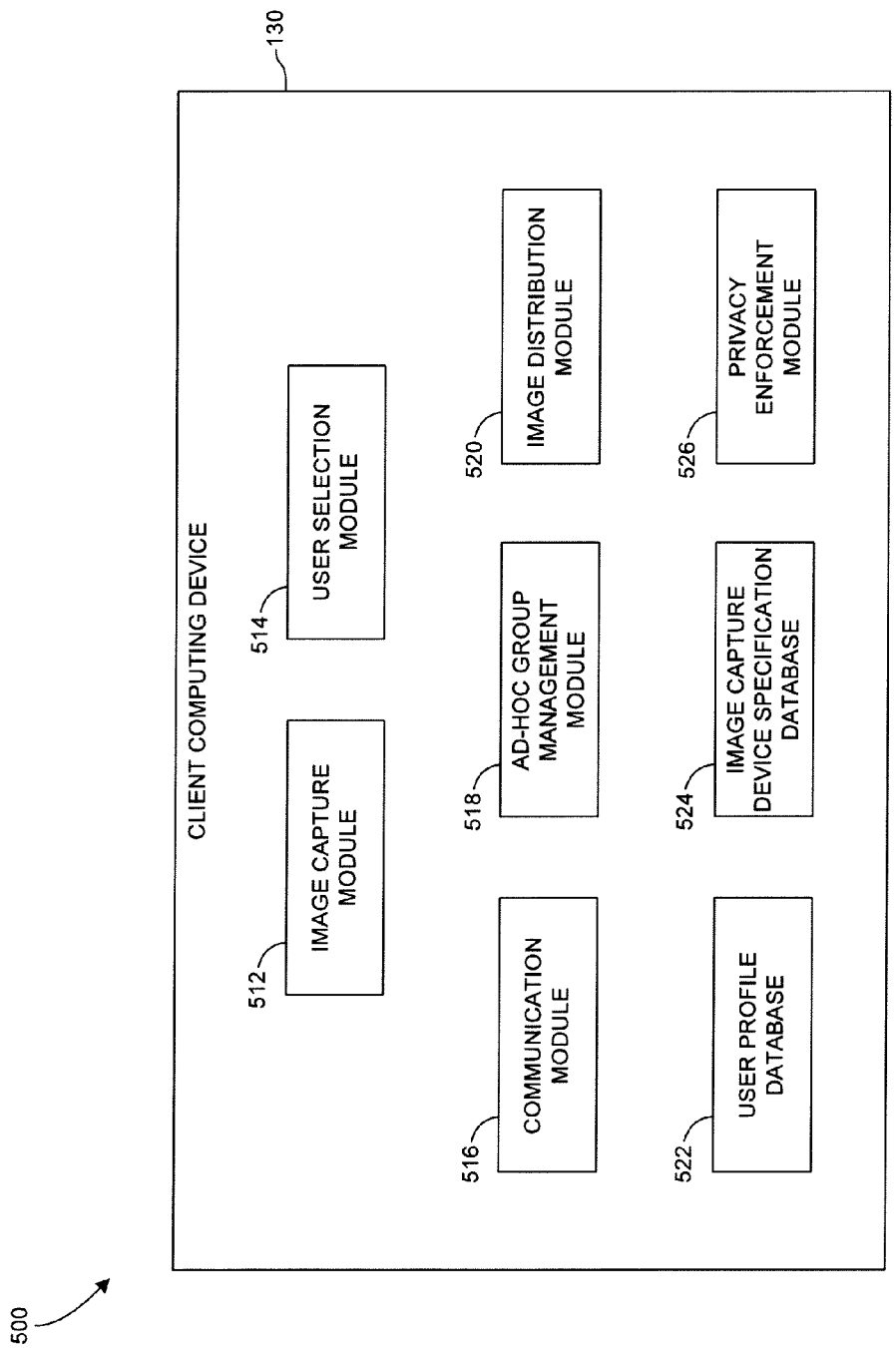
FIG. 5 is a simplified block diagram of at least one embodiment of an environment of the computing device of the system of FIGS. 1-3.

Referring now to FIG. 5, an environment 500 of the client computing device 130 includes a communication module 516, an ad-hoc group management module 518, a user profile database 522, an image capture device specification database 524, a user selection module 514, an image capture module 512, an image distribution module 520, and a privacy enforcement module 526. It should be understood that the environment 500, and/or any of the modules included therein, may be implemented in hardware, firmware, software, or any combination thereof.

As discussed above, in some embodiments, one or more of the client computing devices 130 may establish and join one or more ad-hoc groups without communicating with the resource management server 102 over the network 180. Instead, the one or more client computing devices 130 may join one or more ad-hoc groups (e.g., AD-HOC GROUP A 210 and AD-HOC GROUP B 220) via one or more ad-hoc networks established for sharing images captured at an event. To do so, the communication module 516 of one or more of the client computing devices 130 may facilitate communications with one or more other client computing devices 130 over an ad-hoc network established for each ad-hoc group. Additionally, the communication modules 516 of the client computing devices 130 may use any suitable communication protocol to communicate with each other using the ad-hoc network established for each ad-hoc group depending on, for example, the particular type of ad-hoc network(s).

In some embodiments, the ad-hoc group management module 518 of one or more of the client computing devices 130 may establish one or more ad-hoc groups. Each ad-hoc group may correspond to an upcoming and/or presently occurring event or gathering. For example, the ad-hoc group management module 518 may establish one ad-hoc group corresponding to a particular sporting event and another ad-hoc group corresponding to a social gathering. It should be understood, however, that the ad-hoc group management module 518 may establish any number of ad-hoc groups for any number of events or gatherings, both present and future.

In some embodiments, the communication module 516 of one of the client computing devices 130 may receive a request from one or more of the other client computing devices 130 to join a particular ad-hoc group. In response to receiving such a request, the ad-hoc group management module 518 may allow the one or more other client computing devices 130 to join the requested group. For example, the communication module 516 of the client computing device 300 may receive a request from the CLIENT COMPUTING DEVICE$_N$ 160 to join AD-HOC GROUP A 210 and share images captured at an event or gathering with the one or more other client computing devices 130 in the group. In response to receiving such a request, the ad-hoc group management module 518 of the client computing device 300 may allow the CLIENT COMPUTING DEVICE$_N$ 160 to join the requested ad-hoc group (e.g., AD-HOC GROUP A 210). Additionally, in some embodiments, the ad-hoc group management module 518 may notify the one or more other client computing devices 130 of the acceptance to the requested ad-hoc group. It should be understood that communications between the communication modules 516 of the one or more client computing devices 130 may utilize one or more ad-hoc networks established for each ad-hoc group.

Upon establishing an ad-hoc group (e.g., AD-HOC GROUP A 210), the one or more client computing devices 130 may negotiate which of the client computing devices 130 should manage operations for the group. To do so, the ad-hoc group management module 518 of one of the client computing devices 130 may volunteer to serve as the group manager (e.g., the group leader) in some embodiments. Additionally or alternatively, the ad-hoc group management module 518 of the one or more client computing devices 130 may elect one of the client computing devices 130 to serve as the group manager as a function of comparing which of the client computing devices 130 comprises the most processing power, memory, storage, battery power, or any other characteristic suitable in determining an optimal client computing device.

The user profile database 522 may comprise data associated with a user's account (e.g., user name, password, security questions, contact information, delivery preferences, privacy preferences, etc.). For example, the user profile database 522 may include preferences indicative of the destination (e.g., an email address, a mobile telephone number, a web page, an Internet Protocol address, a digital image frame, an image printer, a mobile application, a postal address, etc.) and/or the delivery format (e.g., email message, photo disc, web image, slideshow, mobile photo message, text message link, etc.). Additionally, in some embodiments, the user profile database 522 may include data indicative of one or more distinguishing characteristics of the user (user-defined strengths and weaknesses, system generated strengths and weaknesses, etc.). For example, the user profile database 522 may comprise a user-defined expertise level in capturing images at particular types of events (e.g., capturing images at sporting events, capturing images at social gathering, capturing images of landscapes or flowers, capturing portrait images, etc.). The user profile database 522 may also include data indicative the quantity or quality of images a user has captured at a particular type of event or data indicative of another user's satisfaction level in images captured by the user at a particular type of event. It should be understood that the user profile database 522 may also comprise any other data indicative of the distinguishing characteristics of a user. In some embodiments, the user profile database 522 may include information corresponding to both a local user's account (e.g., a local profile) and one or more other user accounts (e.g., a remote user's profile).

The image capture device specification database 524 may comprise data and/or specifications associated with one or more image capture devices (e.g., device features, device settings, lens focal lengths, apertures, lens optical quality, focus settings, resolutions, quantity of megapixels, sensor types, shutter speeds, film speeds, flash types, flash compensation settings, device battery level, attached accessory types, filter types, etc.). For example, in some embodiments, the image capture device specification database 524 may store specifications associated the image capture devices 142, 152, 162 of the client computing devices 140, 150, 160. It should be understood that image capture device specification database 524 may also comprise any other data indicative of the features, capabilities, and/or settings of the image capture devices 142, 152, 162 of the client computing devices 130. In some embodiments, the image capture device specification database 524 may include information corresponding to both a local image capture device and one or more other image capture devices (e.g., a remote image capture device).

To reduce the quantity of images captured at an event by multiple users, the user selection module 514 of the client computing device 130 acting as the manager for the ad-hoc group (e.g., AD-HOC GROUP A 210), may select a user of the ad-hoc group to capture images (e.g., take pictures) of the event to be shared with the remaining users of the ad-hoc group. To do so, the user selection module 514 may obtain data indicative of one or more distinguishing characteristics of each user (user-defined strengths and weaknesses, system generated strengths and weaknesses, etc.) of the ad-hoc group from the user profile database 522. Upon obtaining such data, the user selection module 514 may compare the characteristics of each user of the ad-hoc group and determine the most optimal or the most experienced user to capture images of the particular event. To do so, the user selection module 514 may rank or otherwise order the users as a function of the one or more distinguishing characteristics of the users. Additionally, the user selection module 514 may also select more than one user of the ad-hoc group (e.g., a back-up user) to capture images of the event. In that way, the client computing device 130 acting as the manager for the ad-hoc group may share the images captured by the back-up user in the event that either the originally selected user or the selected image capture device is unavailable to capture images during all or a portion of the event.

In addition to selecting a particular user to capture images of an event, the user selection module 514 may also select a client computing device and image capture device for use by the selected user to capture images of the event. For example, in some embodiments, the user selection module 514 may select the image capture device 162 and the CLIENT COMPUTING DEVICE$_N$ 160 for use by the selected user to capture images of the event. To do so, the user selection module 514 may obtain the data and/or specifications associated with each image capture device (e.g., device features, device settings, lens focal lengths, apertures, lens optical quality, focus settings, resolutions, quantity of megapixels, sensor types, shutter speeds, film speeds, flash types, flash compensation settings, device battery level, attached accessory types, filter types, etc.) of the ad-hoc group from the image capture device specification database 524. Upon obtaining such data, the user selection module 514 may compare the specifications and/or features of each of the image capture devices in ad-hoc group to determine the most optimal, the highest quality, or the most reliable image capture device to be used by the selected user to capture images of the particular event. To do so, the user selection module 514 may rank or otherwise order the image capture devices as a function of the one or more of the specifications associated therewith. It should be appreciated that, in such embodiments, the selected client computing device and image capture device may already be devices owned and operated by the selected user or they may be devices owned by another user. That is, the user selection module 514 may select the selected user's own client computing device/image capture device pair for use, or the user selection module 514 may select a different client computing device/image capture device pair for use.

In some embodiments, the user selection module 514 of the client computing device 130 acting as the manager for the ad-hoc group may notify the users of the ad-hoc group which users and devices were selected. To do so, the user selection module 514 may notify the ad-hoc group users via one or more web pages, application messages, user interfaces, text messages, email messages, or any other suitable type of notification displayable on the one or more client computing devices 130 of the users.

The privacy enforcement module 526 may enforce one or more privacy settings for each user of an ad-hoc group. As discussed above, the user profile database 522 may include data indicative of both a local and a remote user's privacy preferences. In some embodiments, the user profile database 522 may comprise one or more user-defined rules or settings that specify an amount of information that may be disclosed to other members of an ad-hoc group. For example, in some embodiments, the user profile database 522 may comprise one or rules or settings that indicate that the selected user does not want their exact location (e.g., latitude, longitude, address of current location, etc.) to be disclosed to other group member. Rather, the one or more user-defined rules or settings associated with the selected user may specify that only their current city, state, or event should be disclosed to other users. Additionally or alternatively, the one or more user-defined rules or settings associated with the selected user may specify that one or more of the captured images should be anonymously shared with the other users (e.g., without disclosing the identity of the selected user). It should be appreciated that the user profile database 522 may include rules indicating that either all or a portion of a user's personal information should be kept private. In that way, each user may specify one or more privacy preferences in a granular manner. In operation, the privacy enforcement module 526 may enforce the one or more privacy settings stored in the user profile database 522 to prevent personal information from being displayed or otherwise disclosed.

Figure 6:
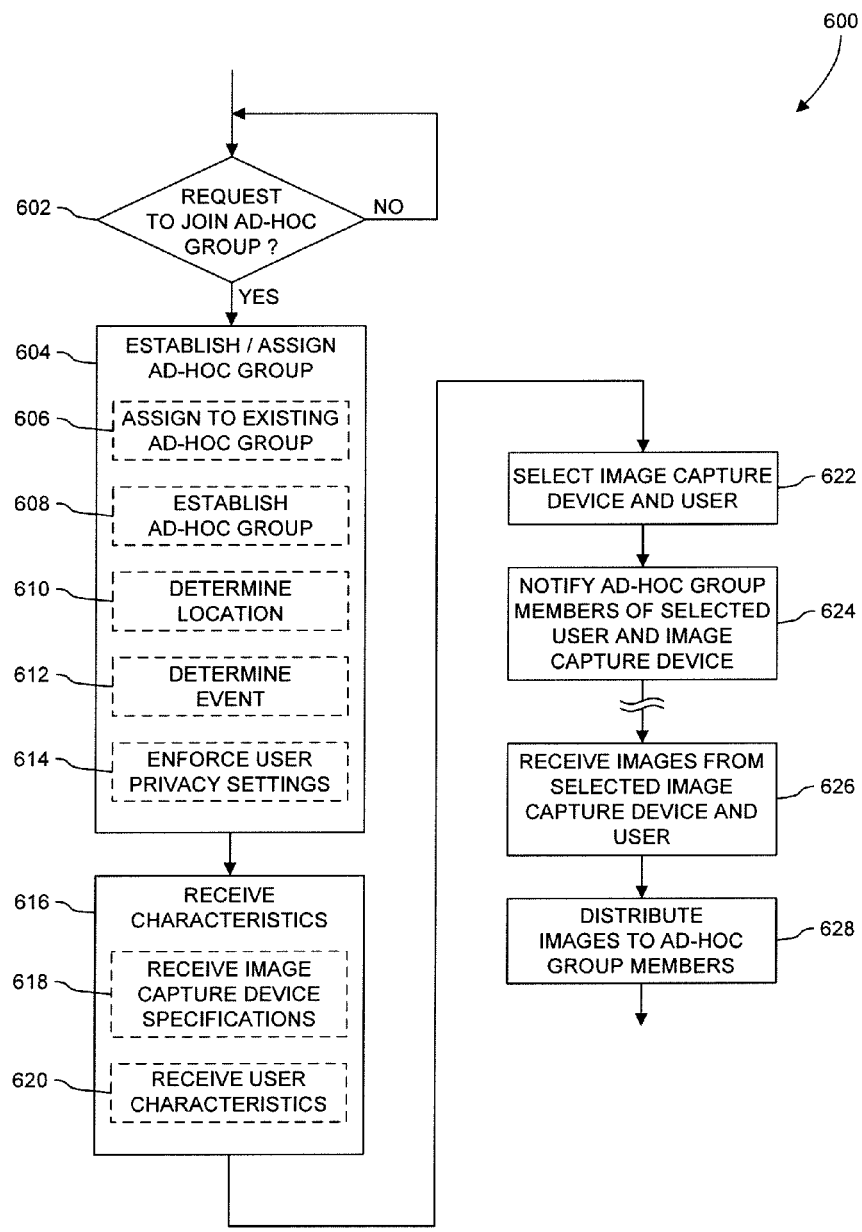
FIG. 6 is a simplified flow diagram of at least one embodiment of a method for establishing an ad-hoc group to share images captured at an event that may be executed by the resource management server of FIGS. 1 and 2.

Referring now to FIG. 6, a method 600 for establishing an ad-hoc group to share images captured at an event that may be executed by the resource management server 102 begins with block 602. In block 602, the resource management server 102 determines whether a request to join an ad-hoc group has been received. As discussed above, the request to join the ad-hoc group may be associated with a request to share one or more images captured at an event. In some embodiments, the resource management server 102 may receive a request to join the ad-hoc group from one or more client computing devices 130. The request to join the ad-hoc group may be received from the client computing devices 130 over the network 180. In response to receiving a request to join an ad-hoc group, the method 600 advances to block 604. If, however, a request to join an ad-hoc group was not received, the method 600 loops back to block 602 to monitor for a request to join an ad-hoc group.

In block 604, the resource management server 102 establishes a new ad-hoc group and/or assigns one or more of the client computing devices 130 an existing ad-hoc group. In some embodiments, the resource management server 102 may determine that the request received from the one or more client computing devices 130 over the network 180 comprises a request to join a particular ad-hoc group. Additionally or alternatively, the resource management server 102 may instead determine that the request received from the one or more client computing devices 130 comprises a request to join an ad-hoc group corresponding to an event or gathering occurring within a reference range of one or more other client computing devices 130. In response to determining that the request comprises a request to join an existing ad-hoc group, the method advances to block 606 in which the resource management server 102 assigns the one or more client computing devices 130 to the existing ad-hoc group.

In some embodiments, the resource management server 102 may establish, at block 608, a new ad-hoc group. As discussed above, the resource management server 102 may establish one or more ad-hoc groups, each of which may correspond to an upcoming and/or presently occurring event or gathering. For example, the resource management server 102 may establish one ad-hoc group corresponding to a particular sporting event and another ad-hoc group corresponding to a social gathering. It should be understood, however, that the resource management server 102 may establish any number of ad-hoc groups for any number of events or gatherings, both present and future.

To facilitate establishing one or more ad-hoc groups and/or assigning the one or more client computing devices 130 to one or more ad-hoc groups, the resource management server 102 may determine, in block 610, the location of the one or more client computing devices 130. In some embodiments, the resource management server 102 may receive data corresponding to a specific location (e.g., latitude, longitude, address, city, state, region, etc.) of the one or more client computing devices 130 along with a request to join an ad-hoc group. However, the resource management server 102 may also receive data indicative of the current location (e.g., a signal strength between the one or more client computing devices 130 and one or more base transceiver stations of a mobile network) rather than specific location information. In such embodiments, the resource management server 102 may calculate the location of the one or more client computing devices 130 from the location data included in the request.

Additionally or alternatively, to facilitate determining a particular event or gathering currently occurring within a reference range of one or more of the client computing devices 130, the resource management server 102 may obtain, at block 612, event information (e.g., an event description, an event time and date, a location of an event, etc.) from an event information server over the network 180. In such embodiments, the resource management server 102 may determine that a particular event or gathering is currently occurring within a reference range of one or more of the client computing devices 130 based on the location and event information obtained. It should be understood that in some embodiments, the resource management server 102 may utilize the location information included with the request to join an ad-hoc group or the location information calculated by the resource management server 102 to query or otherwise obtain only a portion of the event information from the event information server.

In some embodiments, the resource management server 102 may enforce, at block 614, one or more privacy settings for each user of an ad-hoc group. As such, the user profile database 114 may include data indicative of each user's privacy preferences. Additionally, the user profile database 114 may comprise one or more user-defined rules or settings that specify and amount of information that may be disclosed to other members of an ad-hoc group. In such embodiments, the resource management server 102 may enforce the one or more privacy settings for each user using the information stored in the user profile database 114 to prevent personal information from being displayed or otherwise disclosed.

Referring back to block 604, after the resource management server 102 establishes a new ad-hoc group and/or assigns one or more of the client computing devices 130 to an existing ad-hoc group, the method 600 advances to block 616. In block 616, the resource management server 102 receives characteristics from the one or more client computing devices 130 assigned to an ad-hoc group. To do so, the resource management server 102 may receive, at block 618, data and/or specifications associated with one or more image capture devices (e.g., device features, device settings, lens focal lengths, apertures, lens optical quality, focus settings, resolutions, quantity of megapixels, sensor types, shutter speeds, film speeds, flash types, flash compensation settings, device battery level, attached accessory types, filter types, etc.). In some embodiments, the resource management server 102 may store the specifications associated with the one or more image capture devices in the image capture device specification database 116.

Additionally, in some embodiments, the resource management server 102 may also receive, at block 620, data indicative of one or more distinguishing characteristics of each user (user-defined strengths and weaknesses, system generated strengths and weaknesses, etc.) of the ad-hoc group. In such embodiments, the resource management server 102 may store the data indicative of the one or more distinguishing characteristics in the user profile database 114.

Referring back to block 616, after the resource management server 102 receives the characteristics from the one or more client computing devices 130 assigned to the ad-hoc group, the method 600 advances to block 622. In block 622, the resource management server 102 selects a user of the ad-hoc group to capture images (e.g., take pictures) of the event to be shared with the remaining users of the group. To do so, the resource management server 102 may compare the characteristics received for each user of the ad-hoc group and determine the most optimal or the most experienced user to capture images of the particular event. To do so, the resource management server 102 may rank or otherwise order the users as a function of the one or more characteristics received for the users.

In addition to selecting a particular user to capture images of an event, the resource management server 102 may compare the specifications received for each of the image capture devices in the ad-hoc group to determine the most optimal, the highest quality, or the most reliable image capture device to be used by the selected user. To do so, the resource management server 102 may rank or otherwise order the image capture devices as a function of the one or more of the specifications associated therewith. After selecting a user and an image capture device to capture images of the event, the method 600 advances to block 624.

In block 624, the resource management server 102 notifies the users of the ad-hoc group of the user and device selected. To do so, the resource management server 102 may notify the users of the ad-hoc group via one or more web pages, application messages, user interfaces, text messages, email messages, or any other suitable type of notification displayable on the one or more client computing devices 130 of the users. After notifying the users of the ad-hoc group, the method 600 advances to block 626.

In block 626, the resource management server 102 receives one or more images of the event captured by the selected user with the selected image capture device. After receiving the captured images, the method 600 advances to block 628.

In block 628, the resource management server 102 distributes the one or more images captured of the event to the other users of the ad-hoc group. In doing so, the resource management server 102 may distribute the one or more captured images according to the delivery preferences of each of the remaining users of the ad-hoc group. For example, the resource management server 102 may distribute the captured images according to a user-defined destination (e.g., an email address, a mobile telephone number, a web page, an Internet Protocol address, a digital image frame, an image printer, a mobile application, a postal address, etc.) and/or a delivery format (e.g., email message, photo disc, web image, slideshow, mobile photo message, text message link, etc.) specified for each user of the ad-hoc group.

Figure 7:
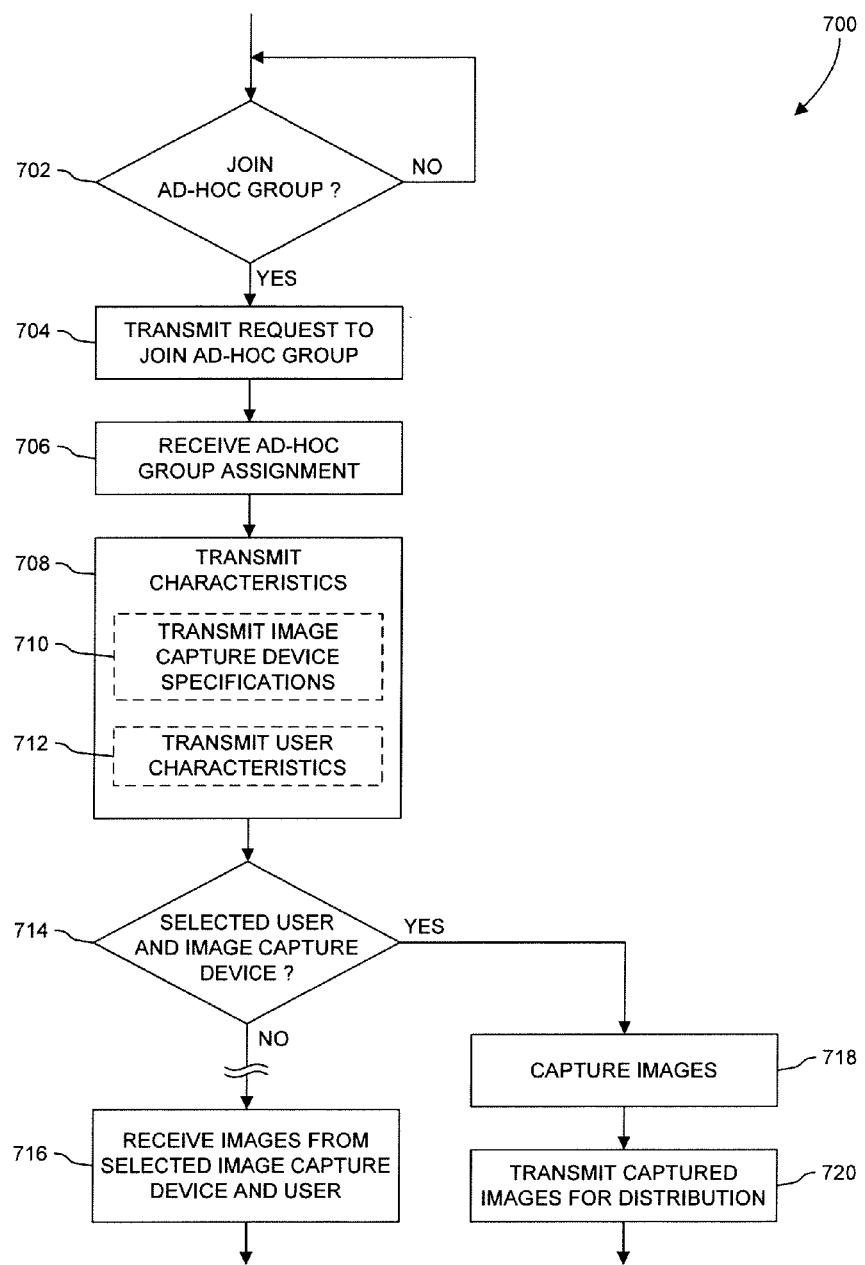
FIG. 7 is a simplified flow diagram of at least one embodiment of a method for joining an ad-hoc group and receiving or sharing images captured at an event that may be executed by the computing devices of FIGS. 1 and 2.

Referring now to FIG. 7, a method 700 for joining an ad-hoc group and receiving or sharing images captured at an event that may be executed by one or more of the client computing devices 130 begins with block 702. In block 702, the one or more client computing devices 130 determines whether a user is requesting to join an ad-hoc group to share images of an event or gathering. To do so, the one or more client computing devices 130 may detect, in some embodiments, whether the user has requested to join an ad-hoc group via one or more selections received from a user interface (UI) displayed on, for example, a display of the one or more client computing devices 130. It should be understood that in other embodiments, the one or more client computing devices 130 may include one or more pushbutton switches, which may be embodied as physical pushbutton switches, "soft" switches, capacitive or resistive switches, other electrical-type switches, non-mechanical switches, or other buttons, switches, or other appropriate circuitry usable by a user to interact with the one or more client computing devices 130. If, at block 702, the one or more client computing device 130 determines that the user is requesting to join an ad-hoc group to share images of an event or a gathering, the method 700 advances to block 704. If, however, the one or more client computing devices 130 determines that the user is not requesting to join an ad-hoc group to share images of an event or a gathering, the method 700 loops back to block 702 to wait for the user to request to join an ad-hoc group.

In block 704, in response to determining that the user is requesting to join an ad-hoc group, the one or more client computing devices 130 transmits a request to join the ad-hoc group to the resource management server 102. In some embodiments, the request transmitted to the resource management server 102 may also include specific location information or data indicative of the location of the one or more client computing devices 130. Upon transmitting the request to join an ad-hoc group to the resource management server 102, the method 700 advances to block 706

In block 706, the one or more client computing devices 130 receives a notification from the resource management server 102 indicating the particular ad-hoc group assigned. Thereafter, the method 700 advances to block 708.

In block 708, the one or more client computing devices 130 may transmit characteristics to the resource management server 102. In doing so, the one or more client computing devices 130 may transmit, at block 710, data and/or specifications (e.g., device features, device settings, lens focal lengths, apertures, lens optical quality, focus settings, resolutions, quantity of megapixels, sensor types, shutter speeds, film speeds, flash types, flash compensation settings, device battery level, attached accessory types, filter types, etc.) associated with an image capture device of the one or more client computing devices 130. Additionally or alternatively, in some embodiments, the one or more client computing devices 130 may transmit, at block 712, data indicative of one or more distinguishing characteristics of the user (user-defined strengths and weaknesses, system generated strengths and weaknesses, etc.) of the one or more client computing devices 130. After transmitting the characteristics to the resource management server 102, the method 700 advances to block 714.

In block 714, the one or more client computing devices 130 determines whether notification was received from the resource management server 102 indicating which users of the one or more client computing devices 130 and/or which image capture devices were selected to capture images of the event. If, at block 714, the one or more users and client computing devices 130 and/or image capture devices are selected to capture images of the event, the method 700 advances to block 718. If, however, the one more users and client computing devices and/or image capture devices are not selected to capture images of the event, the method 700 advances to block 716.

In block 716, in response to the one or more users not being selected to capture images of the event, the one or more client computing devices 130 receives the images captured by another user from the resource management server 102.

In block 718, in response to the one or more users being selected to capture images of the event, the one or more image capture devices associated with one or more client computing devices 130 captures images of the event to be shared with the other users of the ad-hoc group. After capturing the images of the event, the method 700 advances to block 720 in which the one or more client computing devices 130 transmits the captured images to the resource management server 102 for distribution to the other users of the ad-hoc group.

Figure 8:
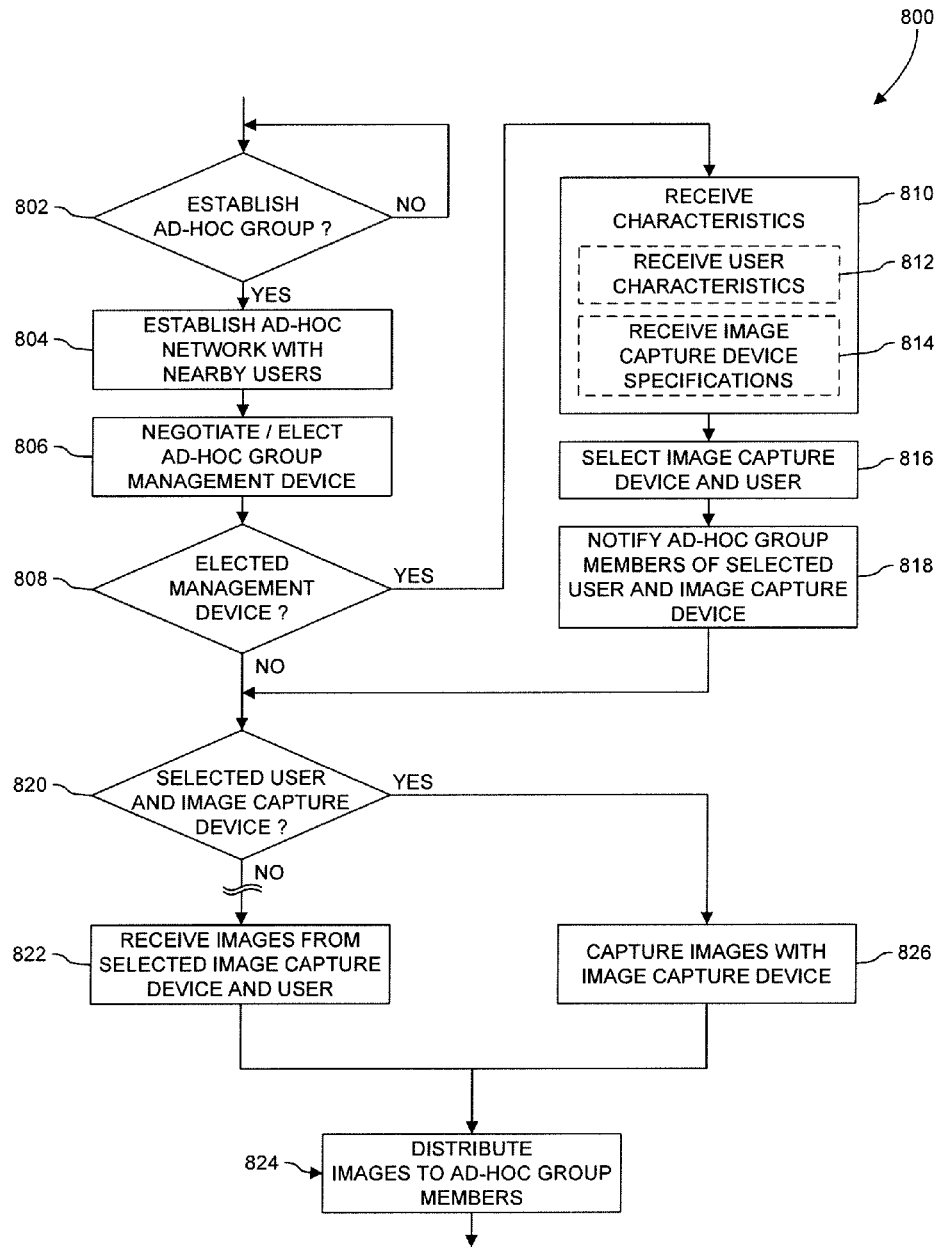
FIG. 8 is a simplified flow diagram of at least one embodiment of a method for establishing an ad-hoc group using an ad-hoc network to share images captured at an event that may be executed by the computing devices of FIG. 3.

Referring now to FIG. 8, a method 800 for establishing an ad-hoc group using an ad-hoc network to share images captured at an event that may be executed by the client computing devices 130 begins with block 802. In block 802, one or more client computing devices 130 determines whether a user is requesting to join an ad-hoc group to share images of an event or gathering. To do so, the one or more client computing devices 130 may detect, in some embodiments, whether the user has requested to establish and/or join an ad-hoc group via one or more selections received from a user interface (UI) displayed on, for example, a display of the one or more client computing devices 130. It should be understood that in other embodiments, the one or more client computing devices 130 may include one or more push-button switches, which may be embodied as physical push-button switches, "soft" switches, capacitive or resistive switches, other electrical-type switches, non-mechanical switches, or other buttons, switches, or other appropriate circuitry usable by a user to interact with the one or more client computing devices 130. If, at block 802, the one or more client computing device 130 determines that the user is requesting to establish and/or join an ad-hoc group to share images of an event or a gathering, the method 800 advances to block 804. If, however, the one or more client computing devices 130 determines that the user is not requesting to establish and/or join an ad-hoc group to share images of an event or a gathering, the method 800 loops back to block 802 to wait for the user to request to establish and/or join an ad-hoc group.

In block 804, the one or more client computing devices establishes a new ad-hoc group with one or more other client computing devices 130 located nearby. To do so the one or more client computing devices 130 may determine that one or more other client computing devices 130 are located within a reference range (e.g., within 10 feet, 100 yards, 2 miles, etc.). In response to determining that the one or more other client computing devices 130 are within a reference range, the one or more client computing devices 130 may establish an ad-hoc group. In some embodiments, an ad-hoc network may be established to facilitate communications between the one or more client computing devices 130 and the one or more other client computing devices 130 of the ad-hoc group. In that way, the one or more client computing devices 130 and the one or more other client computing devices 130 may communicate with each other without relying on an external network such as, for example, the Internet or a WAN. After establishing the ad-hoc group and the corresponding ad-hoc network, the method 800 advances to block 806.

In block 806, the one or more client computing devices 130 may negotiate which client computing device should manage operations for the ad-hoc group. To do so, one or more of the client computing devices 130 may volunteer to serve as the group manager (e.g., the group leader) in some embodiments. Additionally or alternatively, the one or more client computing devices 130 may elect one of the client computing devices 130 to serve as the group manager as a function of comparing which of the client computing devices 130 comprises the most processing power, memory, storage, battery power, or any other characteristic suitable in determining an optimal client computing device. In response to electing one or more of the client computing devices 130 to serve as the group management device, the method 800 advances to block 808.

In block 808, each of the one or more client computing devices 130 determine whether it has been elected to serve as the group management device for the ad-hoc group. If, at block 808, it is determined that the one or more client computing devices 130 has been elected to serve as the group management device for the ad-hoc group, the method 800 advanced to block 810. If, however, it is determined that the one or more client computing devices 130 has not been elected to serve as the group management device for the ad-hoc group, the method 800 advances to block 820.

In block 810, the one or more client computing devices 130 acting as the management device for the ad-hoc group may receive characteristics from the one or more other client computing devices 130 of the ad-hoc group. In doing so, the one or more client computing devices 130 acting as the management device for the ad-hoc group may receive, at block 812, data indicative of one or more distinguishing characteristics of the users (user-defined strengths and weaknesses, system generated strengths and weaknesses, etc.) of the one or more client computing devices 130. Additionally or alternatively, in some embodiments, the one or more client computing devices 130 acting as the management device for the ad-hoc group may also receive, at block 814, data and/or specifications (e.g., device features, device settings, lens focal lengths, apertures, lens optical quality, focus settings, resolutions, quantity of megapixels, sensor types, shutter speeds, film speeds, flash types, flash compensation settings, device battery level, attached accessory types, filter types, etc.) associated with one or more image capture devices. After receiving the characteristics and/or specifications from the one or more other client computing devices 130, the method 800 advances to block 816.

In block 816, the one or more client computing devices 130 acting as the management device for the ad-hoc group selects one or more users to capture images (e.g., take pictures) of an event to be shared with the remaining members of the group. To do so, the one or more client computing devices 130 acting as the management device for the ad-hoc group may compare the characteristics of each user of the ad-hoc group and determine the most optimal or the most experienced user to capture images of the particular event. To do so, the one or more client computing devices 130 acting as the management device for the ad-hoc group may rank or otherwise order the users as a function of the one or more characteristics of the users. Additionally, the one or more client computing devices 130 acting as the management device for the ad-hoc group may also select more than one user of the ad-hoc group (e.g., a back-up user) to capture images of the event. In that way, the one or more client computing devices 130 acting as the management device for the ad-hoc group may share the images captured by the back-up user in the event that either the originally selected user or the selected image capture device is unavailable to capture images during all or a portion of the event.

In addition to selecting a particular user to capture images of an event, the one or more client computing devices 130 acting as the management device for the ad-hoc group may also select a client computing device and image capture device for use by the selected user to capture images of the event. To do so, the one or more client computing devices 130 acting as the management device for the ad-hoc group may compare the specifications and/or features of each of the image capture devices in ad-hoc group to determine the most optimal, the highest quality, or the most reliable image capture device to be used by the selected user to capture images of the particular event. To do so, the one or more client computing devices 130 acting as the management device for the ad-hoc group may rank or otherwise order the image capture devices as a function of the one or more of the specifications and/or features associated therewith. It should be appreciated that, in such embodiments, the selected client computing device and image capture device may already be devices owned and operated by the selected user or they may be devices owned by another user. That is, the one or more client computing devices 130 acting as the management device for the ad-hoc group may select the selected user's own client computing device/image capture device pair for use, or the one or more client computing devices 130 acting as the management device for the ad-hoc group may select a different client computing device/image capture device pair for use.

Returning back to block 816, in response to selecting one or more users and client computing devices or image capture devices, the method 800 advances to block 818. In block 818, the one or more client computing devices 130 acting as the management device for the ad-hoc group may notify the users of the ad-hoc group which users and devices were selected. To do so, the one or more client computing devices 130 acting as the management device for the ad-hoc group may notify the ad-hoc group users via one or more web pages, application messages, user interfaces, text messages, email messages, or any other suitable type of notification displayable on the one or more client computing devices 130 of the users. After notifying the users of the ad-hoc group, the method 800 advances to block 820.

In block 820, the one or more client computing devices 130 acting as the management device for the ad-hoc group may determine whether it and a corresponding user has been selected to capture images of the event. If, at block 820, it is determined that the one or more client computing devices 130 acting as the management device or a corresponding user has not been selected to capture images of the event, the method 800 advances to block 822. If, however, it is determined that the one or more client computing devices 130 acting as the management device or a corresponding user has been selected to capture images of the event, the method 800 advances to block 826.

In block 822, the one or more client computing devices 130 acting as the management device for the ad-hoc group may receive the images captured by the selected user. For example, at the conclusion of the event, or sometime during the event, the one or more client computing devices 130 acting as the management device for the ad-hoc group may receive the captured images from a client computing device corresponding to the selected user and/or image capture device. In response to receiving the images capture at the event, the method 800 advances to block 824 in which the one or more client computing devices 130 acting as the management device for the ad-hoc group distributes the captured images to the remaining members of the ad-hoc group.

In block 826, in response to the one or more client computing devices 130 acting as the management device for the ad-hoc group or a corresponding user being selected to capture images of the event, one or more image capture devices associated with the one or more client computing devices 130 captures images of the event to be shared with the other users of the ad-hoc group. After capturing the images of the event, the method 800 advances to block 824 in which the one or more client computing devices 130 acting as the management device for the ad-hoc group distributes the captured images to the remaining members of the ad-hoc group.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

EXAMPLES

Illustrative examples of the devices, systems, and methods disclosed herein are provided below. An embodiment of the devices, systems, and methods may include any one or more, and any combination of, the examples described below.

In one example, a server for managing resources in an ad-hoc group includes an ad-hoc group management logic unit, a communication logic unit, a user selection logic unit, and an image distribution logic unit. In one example, the ad-hoc group management logic unit may establish and manage ad-hoc groups for sharing images captured at events. Additionally, in one example, the ad-hoc group management logic unit may assign a plurality of users and a plurality of image capture devices to the ad-hoc group to capture and share images of an event over a network. In one example, the communication logic unit may receive (i) user characteristics data for each of the users of the ad-hoc group and (ii) device specification data corresponding to each of the image capture devices of the ad-hoc group over the network. In one example, the user selection logic unit may select a first user and an image capture device to be used by the first user from the ad-hoc group. In one example, the user selection unit may select the first user and the image capture device as a function of the user characteristics data and the device specification data for each of the users and image capture devices of the ad-hoc group. In one example, the image distribution logic unit may distribute the images of the event captured by the selected user using the selected image capture device to the plurality of users of the ad-hoc group over the network.

Additionally, in one example, to select the first user and the image capture device as a function of the user characteristics data and the device specification data may include (i) to compare the user characteristics data and the device specification data for each of the plurality of users and image capture devices, (ii) determine a rank for each of the plurality of users and image capture devices, and (iii) select the first user and the image capture device as a function of a highest rank. In one example, the user characteristics data may include characteristic data indicative of at least one of a user experience level in capturing images, user strengths and weaknesses in capturing images, a quantity of images captured, a quality level of images captured, and a satisfaction level of a third party in captured images. Additionally, in one example, the device specification data may include data indicative of at least one of a device type, a device feature, a sensor type, a device setting, a quantity of megapixels, a device resolution, an attached accessory type, a film speed, a shutter speed, a remaining battery charge, a focal length, an aperture, an optical quality of a lens, a flash type, a flash range, and a flash compensation setting.

Additionally, in one example, the server may further include a data storage. In one example, data storage may include a user profile database and an image capture device specification database. In one example, the user profile database may store user characteristics data for each of the plurality of users. In one example, the image capture device specification database may store specifications for each of the plurality of image capture devices.

In one example, the communication logic unit may further receive the images of the event captured by the selected user using the selected image capture device. Additionally, in one example, to distribute the images of the event captured by the selected user may include to distribute the images in response to receiving the images captured by the user using the selected image capture device. Additionally, in one example, to distribute the images to the plurality of users of the ad-hoc group over the network may include to distribute the images to a reference destination corresponding to each of the plurality of users of the ad-hoc group. In one example, the reference destination may include an email address, a web page, a mobile telephone number, an Internet Protocol address, a digital image frame, an image printer, and a mobile application.

In one example, the communication logic unit may further receive a request from a second user over the network to join the ad-hoc group for sharing the images captured at the event. In one example, the ad-hoc group management logic unit may assign the second user to the ad-hoc group. Additionally, in one example, the ad-hoc group management logic unit may further establish and manage a plurality of ad-hoc groups, each of the plurality of ad-hoc groups corresponding to one of a plurality of events.

Additionally, in one example, the server may further include a location determination logic unit and an event determination logic. In one example, the location determination logic unit may determine a location for each of the plurality of image capture devices. In one example, the event determination logic unit to identify one or more nearby events occurring within a reference rage of each of the plurality of image capture devices. Additionally, in one example, the ad-hoc group management logic unit may further establish a separate ad-hoc group for each event identified. In one example, the ad-hoc group management logic unit may assign a plurality of users and a plurality of image capture devices to an ad-hoc group as a function of the nearby events identified.

Additionally, in one example, the server may further include a privacy enforcement logic unit. In one example, the privacy enforcement logic unit may enforce privacy settings for one or more of the plurality of users. In one example, to enforce privacy settings for one or more of the plurality of users of the ad-hoc group may include to prevent disclosure of user information for one or more of the plurality of users of the ad-hoc group as a function of one or more rules corresponding to the privacy settings of one or more of the plurality of users. Additionally, in one example, to distribute the images of the event captured by the selected user may include to anonymously distribute the images of the event captured by the selected user to the plurality of users of the ad-hoc group over the network.

In another example, a computing device for sharing images captured of an event includes a communication logic unit, an ad-hoc group management logic unit, a user selection logic unit, and an image distribution logic unit. In one example, the communication logic unit may communicate with one or more other computing devices over an ad-hoc network. Additionally, in one example, the one or more other computing devices may be located within a reference range of the computing device. In one example, each of the one or more other computing devices may be associated with a user and include an image capture device. In one example, the ad-hoc group management logic unit may establish and manage an ad-hoc group for sharing images captured of the event. In one example, the ad-hoc group management logic unit may assign each user associated with each of the one or more other computing devices to the ad-hoc group to capture and share images of the event. Additionally, in one example, the user selection logic unit may select a first user of the ad-hoc group to capture images of the event using the image capture device of the other computing device associated with the first user. In one example, the user selection logic unit may select the first user of the ad-hoc group as a function of user characteristics data and device specification data received for each of the users and image capture devices. Additionally, in one example, the image distribution logic unit may distribute images of the event captured by the first user using the image capture device of the other computing device to each user assigned to the ad-hoc group over the ad-hoc network.

Additionally, in one example, to select the first user of the ad-hoc group as a function of user characteristics data and device specification data received for each of the users and image capture devices may include (i) to compare the user characteristics data and the device specification data for each of the users and image capture devices, (ii) determine a rank for each of the users and image capture devices, and (iii) select the first user and the image capture device as a function of a highest rank. In one example, the user characteristics data may include characteristic data indicative of at least one of a user experience level in capturing images, user strengths and weaknesses in capturing images, a quantity of images captured, a quality level of images captured, and a satisfaction level of a third party in captured images. Additionally, in one example, the device specification data may include data indicative of at least one of a device type, a device feature, a sensor type, a device setting, a quantity of megapixels, a device resolution, an attached accessory type, a film speed, a shutter speed, a remaining battery charge, a focal length, an aperture, an optical quality of a lens, a flash type, a flash range, and a flash compensation setting.

Additionally, in one example, the computing device may further include a data storage. In one example, the data storage may include a user profile database and an image capture device specification database. In one example, the user profile database may store user characteristics data for each users. In one example, the image capture device specification database may store specifications for each of the image capture devices.

In one example, the communication logic unit may further receive the images of the event captured by the selected first user using the image capture device of the other computing device. Additionally, in one example, to distribute the images of the event captured by the selected first user may include to distribute the images in response to receiving the images captured by the first user using the image capture device. Additionally, in one example, to distribute the images to the users of the ad-hoc group over the ad-hoc network may include to distribute the images to a reference destination corresponding to each of the users of the ad-hoc group. In one example, the reference destination may include an email address, a web page, a mobile telephone number, an Internet Protocol address, a digital image frame, an image printer, and a mobile application.

Additionally, in one example, the communication logic unit may receive a request from a second user over the ad-hoc network to join the ad-hoc group for sharing the images captured at the event. In one example, the ad-hoc group management logic unit may allow the second user to join the ad-hoc group. In one example, the ad-hoc group management logic unit may further establish and manage a plurality of ad-hoc groups. Additionally, in one example, each of the plurality of ad-hoc groups may correspond to one of a plurality of events.

Additionally, in one example, the computing device may further include a privacy enforcement logic unit to enforce privacy settings for one or more of the users of the ad-hoc group. In one example, to enforce privacy settings for one or more of the users of the ad-hoc group may include to prevent disclosure user information for one or more of the users of the ad-hoc group as a function of one or more rules corresponding to the privacy settings of one or more of the users. Additionally, in one example, to distribute images of the event captured by the first user may include to anonymously distribute the images of the event captured by the first user to each user assigned to the ad-hoc group over the ad-hoc network.

In an example, a method for managing resources in an ad-hoc group may include establishing and managing, by an ad-hoc group management logic unit, ad-hoc groups for sharing images captured at events. In one example, the method may also include assigning, by the ad-hoc group management logic unit, a plurality of users and a plurality of image capture devices to the ad-hoc group to capture and share images of an event over a network. Additionally, in one example, the method may include receiving, by a communication logic unit, (i) user characteristics data for each of the users of the ad-hoc group and (ii) device specification data corresponding to each of the image capture devices of the ad-hoc group over the network. In one example, the method may also include selecting, by a user selection logic unit, a first user and an image capture device to be used by the first user from the ad-hoc group as a function of the user characteristics data and the device specification data for each of the of users and image capture devices of the ad-hoc group. Additionally, in one example, the method may further include distributing, by an image distribution logic unit, images of the event captured by the selected user using the selected image capture device to the plurality of users of the ad-hoc group over the network.

Additionally, in one example, selecting the first user and the image capture device as a function of the user characteristics data and the device specification data may include (i) comparing the user characteristics data and the device specification data for each of the plurality of users and image capture devices, (ii) determining a rank for each of the plurality of users and image capture devices, and (iii) selecting the first user and the image capture device as a function of a highest rank. In one example, the user characteristics data may include characteristic data indicative of at least one of a user experience level in capturing images, user strengths and weaknesses in capturing images, a quantity of images captured, a quality level of images captured, and a satisfaction level of a third party in captured images. Additionally, in one example, the device specification data may include data indicative of at least one of a device type, a device feature, a sensor type, a device setting, a quantity of megapixels, a device resolution, an attached accessory type, a film speed, a shutter speed, a remaining battery charge, a focal length, an aperture, an optical quality of a lens, a flash type, a flash range, and a flash compensation setting.

In one example, the method may also include storing, by a user profile database, user characteristics data for each of the plurality of users. Additionally, in one example, the method may further include storing, by an image capture device specification database, specifications for each of the plurality of image capture devices.

Additionally, in one example, the method may further include receiving, by the communication logic unit, the images of the event captured by the selected user using the selected image capture may include distributing the images in response to receiving the images captured by the user using the selected image capture device. Additionally, in one example, distributing the images to the plurality of users of the ad-hoc group over the network may include distributing the images to a reference destination corresponding to each of the plurality of users of the ad-hoc group. In one example, the reference destination may include an email address, a web page, a mobile telephone number, an Internet Protocol address, a digital image frame, an image printer, and a mobile application.

In one example, the method may further include receiving, by the communication logic unit, a request from a second user over the network to join the ad-hoc group for sharing the images captured at the event. Additionally, in one example, the method may also include assigning, by the ad-hoc group management logic unit, the second user to the ad-hoc group. In one example, the method may further include establishing and managing, by the ad-hoc group management logic unit, a plurality of ad-hoc groups. In one example, each ad-hoc group may correspond to one of a plurality of events.

Additionally, in one example, the method may further include determining, by a location determination logic unit, a location for each of the plurality of image capture devices. In one example, the method may also include identifying, by an event determination logic unit, one or more nearby events occurring within a reference rage of each of the plurality of image capture devices. In one example, the method may also include establishing, by the ad-hoc group management logic unit, a separate ad-hoc group for each event identified. Additionally, in one example, assigning a plurality of users and a plurality of image capture devices to an ad-hoc group may include assigning a plurality of users and a plurality of image capture devices to an ad-hoc group as a function of the nearby events identified.

In one example, the method may further include enforcing, by a privacy enforcement logic unit, privacy settings for one or more of the plurality of users. Additionally in one example, enforcing privacy settings for one or more of the plurality of users of the ad-hoc group may include preventing disclosure of user information for one or more of the plurality of users of the ad-hoc group as a function of one or more rules corresponding to the privacy settings of one or more of the plurality of users. In one example, distributing the images of the event captured by the selected user may include anonymously distributing the images of the event captured by the selected user to the plurality of users of the ad-hoc group over the network.

In another example, a method for sharing images captured of an event may include communicating, by a communication logic unit, with one or more other computing devices over an ad-hoc network. In one example, the one or more other computing devices may be located within a reference range of a computing device. Additionally, in one example, each of the one or more other computing devices may be associated with a user and include an image capture device. Additionally, in one example, the method may include establishing and managing, by an ad-hoc group management logic unit, an ad-hoc group for sharing images captured of an event. In one example, the method may also include assigning, by the ad-hoc group management logic unit, each user associated with each of the one or more other computing devices to the ad-hoc group to capture and share images of the event. Additionally, in one example, the method may also include selecting, by a user selection logic unit, a first user of the ad-hoc group to capture images of the event using the image capture device of the other computing device associated with the first user. In one example, selecting the first user of the ad-hoc group may include selecting the first user as a function of user characteristics data and device specification data received for each of the users and image capture devices. In one example, the method may also include distributing, by an image distribution logic unit, images of the event captured by the first user using the image capture device of the other computing device to each user assigned to the ad-hoc group over the ad-hoc network.

Additionally, in one example, selecting the first user of the ad-hoc group as a function of user characteristics data and device specification data received for each of the users and image capture devices may include (i) comparing the user characteristics data and the device specification data for each of the users and image capture devices, (ii) determining a rank for each of the users and image capture devices, and (iii) selecting the first user and the image capture device as a function of a highest rank. In one example, the user characteristics data may include characteristic data indicative of at least one of a user experience level in capturing images, user strengths and weaknesses in capturing images, a quantity of images captured, a quality level of images captured, and a satisfaction level of a third party in captured images. In one example, the device specification data may include data indicative of at least one of a device type, a device feature, a sensor type, a device setting, a quantity of megapixels, a device resolution, an attached accessory type, a film speed, a shutter speed, a remaining battery charge, a focal length, an aperture, an optical quality of a lens, a flash type, a flash range, and a flash compensation setting. Additionally, in one example, the method may further include storing, by a user profile database, user characteristics data for each users. In one example, the method may also include storing, by an image capture device specification database, specifications for each of the image capture devices.

In one example, the method may further include receiving, by the communication logic unit, the images of the event captured by the selected first user using the image capture device of the other computing device. Additionally, in one example, distributing the images of the event captured by the selected first user may include distributing the images in response to receiving the images captured by the first user using the image capture device. In one example, distributing the images to the users of the ad-hoc group over the ad-hoc network may include distributing the images to a reference destination corresponding to each of the users of the ad-hoc group. In one example, the reference destination may include an email address, a web page, a mobile telephone number, an Internet Protocol address, a digital image frame, an image printer, and a mobile application.

Additionally, in one example, the method may include receiving, by the communication logic unit, a request from a second user over the ad-hoc network to join the ad-hoc group for sharing images captured at the event. In one example, the method may further include allowing, by the ad-hoc group management logic unit, the second user to join the ad-hoc group. Additionally, in one example, the method may further include establishing and managing, by the ad-hoc group management logic unit, a plurality of ad-hoc groups. In one example, each of the plurality of ad-hoc groups may correspond to one of a plurality of events.

Additionally, in one example, the method may further include enforcing, by a privacy enforcement logic unit, privacy settings for one or more of the users of the ad-hoc group. In one example, enforcing privacy settings for one or more of the users of the ad-hoc group may include preventing disclosure of user information for one or more of the users of the ad-hoc group as a function of one or more rules corresponding to the privacy settings of the one or more users. Additionally, in one example, distributing images of the event captured by the first user may include anonymously distributing the images of the event captured by the first user to each user assigned to the ad-hoc group over the ad-hoc network.

What is claimed is:

1. A server for managing resources in an ad-hoc group, the server comprising:
   a processor;
   a memory coupled to the processor;
   a location determination logic unit stored in the memory and executed by the processor, wherein the location determination logic unit is to receive location data from each of a plurality of image capture devices, wherein the location data received from each of the plurality of image capture devices comprises a latitude and longitude of the corresponding image capture device;

an event determination logic unit stored in the memory and executed by the processor, wherein the event determination logic unit is to:
define a reference range; and
identify a plurality of nearby events occurring within the reference range of each of the plurality of image capture devices according to the latitude and longitude of each of the plurality of image capture devices;

an ad-hoc group management logic unit stored in the memory and executed by the processor, wherein the ad-hoc group management logic unit is to:
establish and manage a separate ad-hoc group for each of the plurality of nearby events for sharing images captured at each corresponding event;
assign a plurality of users and two or more of the plurality of image capture devices to the ad-hoc group of each of the plurality of nearby events to capture and share images of the corresponding event over a network based on the latitude and longitude of each corresponding image capture device;

a communication logic unit stored in the memory and executed by the processor, wherein the communication logic unit is to receive (i) user characteristics data for each of the users of the ad-hoc group and (ii) device specification data corresponding to each of the image capture devices of the ad-hoc group over the network;

a user selection logic unit stored in the memory and executed by the processor, wherein the user selection logic unit is to select a first user and an image capture device to be used by the first user from the ad-hoc group of each of the plurality of nearby events, the user selection unit to select the first user and the image capture device as a function of the user characteristics data and the device specification data for each of the users and image capture devices of the corresponding ad-hoc group; and an image distribution logic unit stored in the memory and executed by the processor, wherein the image distribution logic unit is to distribute the images of each of the nearby events captured by the corresponding selected user using the selected image capture device to the plurality of users of each corresponding ad-hoc group over the network.

2. The server of claim 1, wherein to select the first user and the image capture device as a function of the user characteristics data and the device specification data comprises (i) to compare the user characteristics data and the device specification data for each of the plurality of users and image capture devices, (ii) determine a rank for each of the plurality of users and image capture devices, and (iii) select the first user and the image capture device as a function of a highest rank.

3. The server of claim 1, wherein the user characteristics data comprises characteristic data indicative of at least one of a user experience level in capturing images, user strengths and weaknesses in capturing images, a quantity of images captured, a quality level of images captured, and a satisfaction level of a third party in captured images.

4. The server of claim 1, wherein the device specification data comprises data indicative of at least one of a device type, a device feature, a sensor type, a device setting, a quantity of megapixels, a device resolution, an attached accessory type, a film speed, a shutter speed, a remaining battery charge, a focal length, an aperture, an optical quality of a lens, a flash type, a flash range, and a flash compensation setting.

5. The server of claim 1, further comprising a data storage comprising a user profile database and an image capture device specification database, the user profile database to store user characteristics data for each of the plurality of users and the image capture device specification database to store specifications for each of the plurality of image capture devices.

6. The server of claim 1, wherein the communication logic unit further to receive the images of the event captured by the selected user using the selected image capture device, and
wherein to distribute the images of the event captured by the selected user comprises to distribute, in response to receiving the captured images from the selected user, the captured images to a reference destination corresponding to each of the plurality of users of the ad-hoc group.

7. The server of claim 6, wherein the reference destination comprises an email address, a web page, a mobile telephone number, an Internet Protocol address, a digital image frame, an image printer, and a mobile application.

8. The server of claim 1, wherein the communication logic unit further to receive a request from a second user over the network to join the ad-hoc group for sharing the images captured at the event, and wherein the ad-hoc group management logic unit further to assign the second user to the ad-hoc group.

9. The server of claim 1, wherein the ad-hoc group management logic unit further to establish and manage a plurality of ad-hoc groups, each of the plurality of ad-hoc groups corresponding to one of a plurality of events.

10. The server of claim 1, further comprising a privacy enforcement logic unit stored in the memory and executed by the processor, wherein the privacy enforcement logic unit is to prevent disclosure of user information for one or more of the plurality of users of the ad-hoc group as a function of one or more rules corresponding to privacy settings of one or more of the plurality of users, and
wherein to distribute the images of the event captured by the selected user comprises to anonymously distribute the images of the event captured by the selected user to the plurality of users of the ad-hoc group over the network.

11. One or more non-transitory, machine readable media comprising a plurality of instructions stored thereon, which in response to execution by a computing device, cause the computing device to:
receive location data from each of a plurality of image capture devices, wherein the location data received from each of the plurality of image capture devices comprises a latitude and longitude of the corresponding image capture device;
define a reference range; and
identify a plurality of nearby events occurring within the reference range of each of the plurality of image capture devices according to the latitude and longitude of each of the plurality of image capture devices;
establish and manage a separate ad-hoc group for each of the plurality of nearby events for sharing images captured at each corresponding event;
assign a plurality of users and two or more of the plurality of image capture devices to the ad-hoc group of each of the plurality of nearby events to capture and share images of the corresponding event over a network based on the latitude and longitude of each corresponding image capture device;

receive (i) user characteristics data for each of the users of the ad-hoc group and (ii) device specification data corresponding to each of the image capture devices of the ad-hoc group over the network;

select a first user and an image capture device to be used by the first user from the ad-hoc group of each of the plurality of nearby events as a function of the user characteristics data and the device specification data for each of the of users and image capture devices of the corresponding ad-hoc group;

receive the images of the each of the nearby events captured by the corresponding selected user using the selected image capture device; and distribute the images of the event received from the selected user to a reference destination on the network corresponding to each of the plurality of users of the corresponding ad-hoc group.

12. The one or more non-transitory, machine readable media of claim 11, wherein to select the first user and the image capture device as a function of the user characteristics data and the device specification data comprises to: (i) compare the user characteristics data and the device specification data for each of the plurality of users and image capture devices, (ii) determine a rank for each of the plurality of users and image capture devices, and (iii) select the first user and the image capture device as a function of a highest rank.

13. A computing device for sharing images captured of an event, the computing device comprising:

a processor;

a memory coupled to the processor;

a communication logic unit stored in the memory and executed by the processor, wherein the communication logic unit is to:

communicate with one or more other computing devices over an ad-hoc network, the one or more other computing devices being located within a reference range of the computing device, each of the one or more other computing devices associated with a user and comprises an image capture device; and receive location data from each of the one or more computing devices, wherein the location data received from each of the one or more computing devices comprises a latitude and longitude of the corresponding computing device;

an event determination logic unit stored in the memory and executed by the processor, wherein the event determination logic unit is to identify a plurality of nearby events occurring within the reference range;

an ad-hoc group management logic unit stored in the memory and executed by the processor, wherein the ad-hoc group management logic unit is to establish and manage a separate ad-hoc group for each of the nearby events for sharing images captured of each of the nearby events, the ad-hoc group management logic unit to assign, based on the corresponding longitude and latitude, each user associated with each of the one or more other computing devices to one of the ad-hoc groups to capture and share images of the corresponding event;

a user selection logic unit stored in the memory and executed by the processor, wherein the user selection logic unit is to select a first user of each of the ad-hoc groups to capture images of the corresponding event using the image capture device of the other computing device associated with the first user, the user selection logic unit to select the first user of each ad-hoc group as a function of user characteristics data and device specification data received for each of the users and image capture devices; and an image distribution logic unit stored in the memory and executed by the processor, wherein the image distribution logic unit is to distribute images of each event captured by the first user using the image capture device of the other computing device to each user assigned to the corresponding ad-hoc group over the ad-hoc network.

14. The computing device of claim 13, wherein to select the first user of the ad-hoc group as a function of user characteristics data and device specification data received for each of the users and image capture devices comprises (i) to compare the user characteristics data and the device specification data for each of the users and image capture devices, (ii) determine a rank for each of the users and image capture devices, and (iii) select the first user and the image capture device as a function of a highest rank.

15. The computing device of claim 13, wherein the user characteristics data comprises characteristic data indicative of at least one of a user experience level in capturing images, user strengths and weaknesses in capturing images, a quantity of images captured, a quality level of images captured, and a satisfaction level of a third party in captured images.

16. The computing device of claim 13, wherein the device specification data comprises data indicative of at least one of a device type, a device feature, a sensor type, a device setting, a quantity of megapixels, a device resolution, an attached accessory type, a film speed, a shutter speed, a remaining battery charge, a focal length, an aperture, an optical quality of a lens, a flash type, a flash range, and a flash compensation setting.

17. The computing device of claim 13, further comprising a data storage comprising a user profile database and an image capture device specification database, the user profile database to store user characteristics data for each users and the image capture device specification database to store specifications for each of the image capture devices.

18. The computing device of claim 13, wherein the communication logic unit further to receive the images of the event captured by the selected first user using the image capture device of the other computing device, and wherein to distribute the images of the event captured by the selected first user comprises to distribute, in response to receiving the captured images from the selected first user, the captured images over the ad-hoc network to a reference destination corresponding to each of the users of the ad-hoc group.

19. The computing device of claim 13, wherein the communication logic unit further to receive a request from a second user over the ad-hoc network to join the ad-hoc group for sharing the images captured at the event, and wherein the ad-hoc group management logic unit further to allow the second user to join the ad-hoc group.

20. The computing device of claim 13, wherein the ad-hoc group management logic unit further to establish and manage a plurality of ad-hoc groups, each of the plurality of ad-hoc groups corresponding to one of a plurality of events.

21. The computing device of claim 13, further comprising a privacy enforcement logic unit stored in the memory and executed by the processor, wherein the privacy enforcement logic unit is to prevent disclosure of user information for one or more of the of users of the ad-hoc group as a function of one or more rules corresponding to privacy settings of one or more of the of users, and wherein to distribute images of the event captured by the selected first user comprises to anonymously distribute, over the ad-hoc network, the images of the event captured by the selected first user to each user assigned to the ad-hoc group.

22. One or more non-transitory, machine readable media comprising a plurality of instructions stored thereon, which in response to execution by a computing device, cause the computing device to:

communicate with one or more other computing devices over an ad-hoc network, the one or more other computing devices being located within a reference range of a computing device, each of the one or more other computing devices associated with a user and comprises an image capture device;

receive location data from each of the one or more computing devices, wherein the location data received from each of the one or more computing devices comprises a latitude and longitude of the corresponding computing device;

to identify a plurality of nearby events occurring within the reference range;

establish and manage a separate ad-hoc group for each of the nearby events for sharing images captured of each of the nearby events;

assign, based on the corresponding longitude and latitude, each user associated with each of the one or more other computing devices to one of the ad-hoc groups to capture and share images of the corresponding event;

select a first user of each of the ad-hoc groups to capture images of the corresponding event using the image capture device of the other computing device associated with the first user, wherein to select the first user of each ad-hoc group comprises to select the first user as a function of user characteristics data and device specification data received for each of the users and image capture devices;

receive the images of the event captured by the selected first user using the image capture device of the other computing device; and distribute the images of each event received from the selected first user to a reference destination on the ad-hoc network corresponding to each user assigned to the ad-hoc group.

23. The one or more machine readable media of claim 22, wherein to select the first user of the ad-hoc group as a function of user characteristics data and device specification data received for each of the users and image capture devices comprises to: (i) compare the user characteristics data and the device specification data for each of the users and image capture devices, (ii) determine a rank for each of the users and image capture devices, and (iii) select the first user and the image capture device as a function of a highest rank.

\* \* \* \* \*